United States Patent
Rogers et al.

(10) Patent No.: US 10,053,356 B2
(45) Date of Patent: Aug. 21, 2018

(54) SYSTEMS, KITS AND METHODS FOR HANDS FREE, ON DEMAND, ORAL DELIVERY OF MATERIALS

(71) Applicant: Rx Hydration, Inc., Santa Clara, CA (US)

(72) Inventors: Shane Patrick Rogers, San Jose, CA (US); Brain Charles Holm, Mountain View, CA (US)

(73) Assignee: Rx Hydration, Inc., Santa Clara, CA (US)

( * ) Notice: Subject to any disclaimer, the term of this patent is extended or adjusted under 35 U.S.C. 154(b) by 550 days.

(21) Appl. No.: 13/864,964

(22) Filed: Apr. 17, 2013

(65) Prior Publication Data

US 2014/0144944 A1    May 29, 2014

Related U.S. Application Data

(60) Provisional application No. 61/637,278, filed on Apr. 24, 2012, provisional application No. 61/747,305, filed on Dec. 30, 2012, provisional application No. 61/763,198, filed on Feb. 11, 2013.

(51) Int. Cl.
| | |
|---|---|
| *F16K 31/00* | (2006.01) |
| *B67D 7/36* | (2010.01) |
| *A45F 3/16* | (2006.01) |
| *F16K 11/00* | (2006.01) |
| *F16K 21/04* | (2006.01) |

(52) U.S. Cl.
CPC .................. *B67D 7/36* (2013.01); *A45F 3/16* (2013.01); *F16K 19/00* (2013.01); *F16K 21/04* (2013.01); *Y10T 137/0318* (2015.04); *Y10T 137/87676* (2015.04)

(58) Field of Classification Search
CPC ... A47G 21/185; A61J 15/0092; B65D 35/00; B65D 35/242; F16K 15/147; B67D 7/36
USPC ...... 137/606; 251/342; 222/145.5, 175, 494; 220/703, 714; 224/148.2
See application file for complete search history.

(56) References Cited

U.S. PATENT DOCUMENTS

| | | | |
|---|---|---|---|
| 3,342,208 A * | 9/1967 | Steffes | F16K 15/147 137/516.11 |
| 5,084,349 A | 2/1992 | Fawcett | |
| 5,601,207 A | 2/1997 | Paczonay | |
| 5,715,863 A | 2/1998 | Paczonay | |
| 5,755,368 A * | 5/1998 | Bekkedahl | B62J 11/00 222/175 |
| 5,816,457 A | 10/1998 | Croft | |
| 5,911,406 A | 6/1999 | Winefordner | |
| 6,032,831 A | 3/2000 | Gardner et al. | |
| 6,039,305 A | 3/2000 | Hoskins et al. | |
| 6,062,435 A | 5/2000 | Hess | |

(Continued)

*Primary Examiner* — Reinaldo Sanchez-Medina
(74) *Attorney, Agent, or Firm* — Richard E. Ballard

(57) ABSTRACT

Systems, methods and kits for orally delivering material via a pliable valve comprising a primary passageway, a secondary passageway, a primary valve oriented within the primary passageway, a secondary valve oriented within the secondary passageway, a first surface feature on an exterior surface of the bite valve, and a second surface feature on the exterior surface of the bite valve, wherein pressure applied to the first surface position opens a primary valve and pressure applied to the second surface position opens the primary and secondary valves are disclosed.

27 Claims, 23 Drawing Sheets

(56) References Cited

U.S. PATENT DOCUMENTS

| | | | |
|---|---|---|---|
| 6,070,767 A | 6/2000 | Gardner et al. | |
| 6,085,947 A | 6/2000 | Lien | |
| 6,116,458 A | 9/2000 | Dark | |
| 6,264,166 B1 | 7/2001 | Bowland et al. | |
| 6,279,772 B1 | 8/2001 | Bowman | |
| 6,364,168 B1 | 4/2002 | Gardner et al. | |
| 6,497,348 B2 | 12/2002 | Forsman et al. | |
| 6,622,988 B2 | 9/2003 | Gill | |
| 6,708,950 B2 | 3/2004 | Christensen et al. | |
| 6,719,273 B1 | 4/2004 | Yang | |
| 6,722,533 B2 | 4/2004 | Skillern | |
| 6,742,681 B1 | 6/2004 | Yang | |
| 6,749,090 B2 | 6/2004 | Bailey | |
| 6,755,047 B2 * | 6/2004 | Kreutzmann | A42B 3/048 62/400 |
| 6,837,026 B2 | 1/2005 | Setton | |
| 6,874,760 B2 | 4/2005 | Steckel | |
| 6,886,807 B1 | 5/2005 | Gill | |
| 6,908,015 B2 | 6/2005 | Choi et al. | |
| 6,997,181 B2 | 2/2006 | Fletcher | |
| 7,014,077 B2 | 3/2006 | Brown | |
| 7,028,929 B2 | 4/2006 | Yang | |
| 7,070,065 B2 | 7/2006 | Wong | |
| 7,073,688 B2 | 7/2006 | Choi et al. | |
| 7,198,079 B2 | 4/2007 | Kline | |
| 7,204,380 B2 | 4/2007 | Webb et al. | |
| 7,204,382 B2 | 4/2007 | Cezeaux | |
| D547,606 S | 7/2007 | Forsman | |
| 7,243,860 B2 | 7/2007 | Junkel et al. | |
| 7,267,245 B2 | 9/2007 | Yang | |
| 7,311,231 B2 | 12/2007 | Noell et al. | |
| 7,334,707 B2 | 2/2008 | Hoskins | |
| 7,490,740 B2 | 2/2009 | Robins et al. | |
| 7,533,783 B2 | 5/2009 | Choi et al. | |
| 7,533,786 B2 | 5/2009 | Woolfson et al. | |
| 7,600,656 B2 | 10/2009 | Karl et al. | |
| 7,600,657 B2 | 10/2009 | Wang | |
| 7,621,294 B2 | 11/2009 | Wang | |
| 7,631,672 B2 | 12/2009 | Spencer | |
| 7,658,303 B2 | 2/2010 | Woofson et al. | |
| 7,703,634 B2 | 4/2010 | Rohrig | |
| 7,753,225 B2 | 7/2010 | Rohrig | |
| 7,806,300 B1 | 10/2010 | Noell et al. | |
| 8,267,283 B2 | 9/2012 | Staton | |
| 2003/0150877 A1 | 8/2003 | Sturm et al. | |
| 2003/0173536 A1 * | 9/2003 | Christensen | A45F 3/16 251/342 |
| 2004/0262331 A1 | 12/2004 | Woolfson et al. | |
| 2005/0242130 A1 * | 11/2005 | Yang | F16K 15/147 222/490 |
| 2009/0196675 A1 * | 8/2009 | May | B29C 45/0081 401/206 |
| 2009/0302261 A1 | 12/2009 | Skillern | |
| 2010/0213223 A1 * | 8/2010 | Ballentine | A45F 3/04 224/148.2 |

* cited by examiner

SYSTEMS, KITS AND METHODS FOR HANDS FREE, ON DEMAND, ORAL DELIVERY OF MATERIALS

CROSS-REFERENCE

This application claims the benefit of U.S. Provisional Application Nos. 61/637,278 filed Apr. 24, 2012, 61/747,305 filed Dec. 30, 2012, and 61/763,198 filed Feb. 11, 2013, which applications are incorporated herein by reference.

BACKGROUND OF THE INVENTION

Medical research on the subject of nourishment during prolonged exercise has shown that hydration with a carbohydrate-rich hypotonic fluid—i.e., a "sports drink"—is the most effective technique for preventing dehydration and minimizing fatigue. Dehydration may be of three types: hypotonic, which is characterized by a loss of electrolytes, sodium in particular; hypertonic, which is characterized primarily by a loss of water; and isotonic, which is characterized by an equal loss of water and electrolytes. Hypotonic dehydration may be prevented by proper consumption of hypotonic fluids. Hypotonic fluids contain electrolytes, which allow cells to generate energy and electricity. Consuming hypotonic fluids causes muscles to contract, circulates water and fluids throughout the body, and provides numerous other benefits that help athletes maximize endurance. Carbohydrates may also help prevent hypotonic dehydration. Carbohydrates are the fuel for human metabolism and the primary source of energy for the human body. Among the most common carbohydrates is glucose, a simple sugar (monosaccharide).

As sports have grown in popularity, increased attention has been focused on developing hypotonic fluids rich with carbohydrates. Sports drink manufacturers generally attempt to develop products that include optimal amounts of electrolytes and carbohydrates. However, many sports drinks are high in calories, and consuming them in excess poses risks and drawbacks for athletes. To overcome this challenge, athletes may carry both water and a sports drink when engaging in prolonged exercise.

One technique for carrying and dispensing these fluids that has gained popularity over the last twenty years is the use of a hydration pack. See, for example, U.S. Pat. No. 5,085,349 A issued Feb. 4, 1992, by Fawcett entitled "Resilient Valve and Dispensing System for Bicyclists;" U.S. Pat. No. 8,267,283 B2 issued Sep. 18, 2012, by Staton, entitled "Personal Hydration System;" U.S. Pat. No. 7,631,672 B2 issued Dec. 15, 2009, by Spencer, entitled "Portable Hydration System with Resupply System;" D,547,606 S issued Jul. 31, 2007, by Forsman entitled "Bite Actuated Mouthpiece;" U.S. Pat. No. 6,364,168 B1 issued Apr. 2, 2002, by Gardner et al., entitled "Personal Hydration System with an Improved Mouthpiece;" U.S. Pat. No. 6,874,760 B2 issued Apr. 5, 2005, by Steckel, for "Angled-Slit Bite-Valve;" and U.S. Pat. Nos. 7,533,786 B2 and 7,658,303 B2 issued May 19, 2009, and Feb. 9, 2010, respectively, by Woolfson, et al., entitled "Personal Water and Additive Apparatus."

A hydration pack generally includes a fluid reservoir in the form of a bag and a hose attached at or near the bottom. The hose is typically designed to be long enough to reach the user's mouth. Fluid is dispensed to the user through a valve connected to the end of the hose. The valve is usually made from an easily deformable material such that when it is compressed by the users' mouth or teeth, the fluid can be drawn from the reservoir at will.

The reservoir may contain all types of drinkable fluids. However, fluids containing any form of carbohydrate (e.g., sugar in common sports drinks) often leave behind a sticky residue that may be difficult or impossible to remove from the reservoir. The residue may affect the flavor and composition of any liquid subsequently kept in the reservoir. If left uncleaned, the residue may cause bacteria to grow within the reservoir and contaminate its contents. Consequently, many users of personal hydration systems only fill the reservoir with water and carry a supplemental supply of electrolytes and carbohydrates in a separate container. This approach limits the utility of the hydration pack, since the user must carry two separate items.

SUMMARY OF THE INVENTION

An aspect of the disclosure is directed to a valve apparatus. The valve apparatus comprises: a pliable valve comprising a primary passageway, a secondary passageway, a primary valve capable of obstructing the primary passageway, a secondary valve capable of obstructing the secondary passageway wherein hands-free pressure applied to the valve opens one or more of a primary valve and a secondary valve. Additionally, a first surface feature can be provided on an exterior surface of the valve, and a second surface feature on the exterior surface of the valve. In at least some configurations, a housing is provided wherein the housing comprises one or more of a primary material inlet, a piercing valve, a primary material outlet, a dispersed material outlet, and a secondary material outlet. The dispersed material outlet can further be comprised of a plurality of apertures oriented radially surrounding the secondary material outlet. Additionally, a secondary material reservoir couplable to the housing, wherein the secondary material reservoir further comprises a seal capable of receiving the piercing valve. A hose can also be provided that is couplable to a reservoir and the housing. In some configurations a fluid connecting port capable of routing fluid from the hose through at least one of the primary material outlet and the dispersed material outlet is provided. The pliable valve is orally manipulatable to draw material through at least one of a first slit and a second slit. The secondary material reservoir can be configured to include a structure, such as a helical structure, capable of preventing an obstruction of the secondary material. Moreover, the size of the secondary material reservoir can be from 1 ml-1000 ml in volume. A control valve can also be provided which is disposed within the valve cavity, the control valve comprising a plug capable of closing the aperture, a bite bulb, a main body, a blocking component, and a pin.

Another aspect of the disclosure is directed to an apparatus comprising: a housing comprising a primary material inlet, and a housing outlet; a connector couplable to a reservoir and the primary material inlet; a pliable valve comprising a primary passageway, a secondary passageway, a primary valve capable of obstructing the primary passageway, a secondary valve capable of obstructing the secondary passageway wherein hands-free pressure applied to the valve opens one or more of a primary valve and a secondary valve; and a secondary material tube couplable to the housing. In some configurations, the control valve can further comprise at least two vertical walls and, the two vertical walls form a slit, and the secondary material path merges with the slit beneath the secondary bite position. Additionally, the externally applied force can cause the control valve to collapse, the slit to open, and the secondary material path to close. In at least some configurations, the housing can further comprise a first annular groove, a second annular groove, and a third annular groove. The first annular groove and the third annular groove can also be configured to engage with the bite valve, and the second annular groove is capable of receiving the secondary material from the secondary material tube and routing the secondary material to the pliable bite valve.

Yet another aspect of the disclosure is directed to a method of providing material to a mammal. Suitable methods comprise the steps of: providing a pliable valve comprising a primary passageway, a secondary passageway, a primary valve capable of obstructing the primary passageway, a secondary valve capable of obstructing the secondary passageway wherein hands-free pressure applied to the valve opens one or more of a primary valve and a secondary valve; providing a reservoir of a first material in communication with the primary passageway; and providing a reservoir of a second material in communication with the secondary passageway; providing hands-free control of the pliable valve to open one or more of the primary valve and the secondary valve. At least some methods can also include one or more of each of the steps of: orally applying pressure to a first surface feature of the valve to deliver the first material into a mouth of a patient, and orally applying pressure to a second surface feature to deliver the second material or a combination of two materials into a mouth of a patient. The first material is selectable from a group comprising a fluid in the form of water, steam, and gas; and the second material is selectable from the group comprising a fluid in the form of electrolytes, carbohydrates, alcohol, and medicament solution.

Still another aspect of the disclosure is directed to a delivery member apparatus. The delivery member apparatus can comprise: a delivery member having a reservoir, a material outlet wherein the material outlet has an outer surface and a side surface forming a tapered cylindrical member and further wherein the material outlet has an aperture therethrough in communication with an interior of the reservoir; a channel surrounding a portion of the tapered cylindrical member; and an exterior casing surrounding the channel and the tapered cylindrical member wherein the exterior casing has a rotation stop on an outer surface capable of engaging a dispensing apparatus housing. In at least some configurations, the delivery member further comprises one or more of a pierceable seal positioned over the material outlet aperture, and an externally positioned locking mechanism. The exterior casing can further be configured to include a rotation stop. Additionally, the material outlet of the delivery member is configured to engage a conical fitting having a 6% Luer taper.

Still another aspect of the disclosure is directed to a kit. A suitable kit comprises: one or more delivery members having a reservoir, a material outlet wherein the material outlet has an outer surface and a side surface forming a tapered cylindrical member and further wherein the material outlet has an aperture therethrough in communication with an interior of the reservoir; a channel surrounding a portion of the tapered cylindrical member; and an exterior casing surrounding the channel and the tapered cylindrical member wherein the exterior casing has a rotation stop on an outer surface capable of engaging a pliable valve. Additional components of the kit can include, for example, one or more pliable valves comprising a primary passageway, a secondary passageway, a primary valve oriented within the primary passageway, a secondary valve oriented within the secondary passageway wherein hands-free pressure applied to the valve opens one or more of a primary valve and a secondary valve, and one or more materials for delivery via the pliable valve. Suitable materials can be selected from the group comprising fluids in the form of electrolytes, carbohydrates, alcohol, and medicament solutions. Kits are typically provided in suitable packaging, which may be disposable.

Yet another aspect of the disclosure is directed to a kit comprising: one or more reservoirs capable of engaging a pliable valve comprising a primary passageway, a secondary passageway, a primary valve capable of obstructing the primary passageway, a secondary valve capable of obstructing the secondary passageway wherein hands-free pressure applied to the valve opens one or more of a primary valve and a secondary valve. Additional components of the kit can include, for example, one or more pliable valves comprising a primary passageway, a secondary passageway, a primary valve oriented within the primary passageway, a secondary valve oriented within the secondary passageway wherein hands-free pressure applied to the valve opens one or more of a primary valve and a secondary valve, and one or more materials for delivery via the pliable valve. Suitable materials can be selected from the group comprising fluids in the form of electrolytes, carbohydrates, alcohol, and medicament solutions. Kits are typically provided in suitable packaging, which may be disposable.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
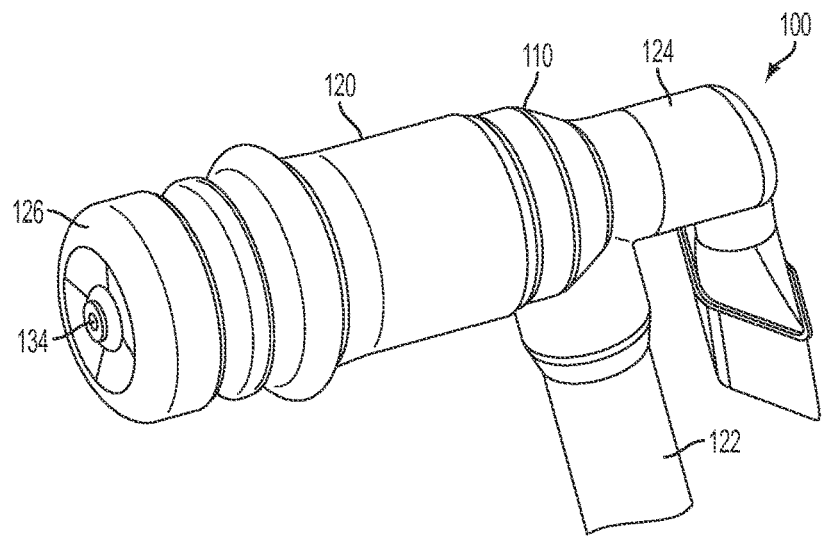
FIGS. 1A-C depict a dispensing apparatus.

I. Fluid Delivery Systems and Components Thereof

Fluid includes but is not limited to the liquids and gases. Devices and systems include a mechanism for users to select delivery of a material such as a primary fluid, a secondary fluid, or a combination of the primary and secondary fluid. The system may include one or more reservoirs which may be refillable. The reservoir may include a pliable enclosure with a re-sealable opening at one end and a hose attached at the other end. The primary fluid may be stored in the reservoir and the secondary fluid may be stored in a secondary reservoir. The user may draw the fluids by applying pressure to the bite valve with lips and/or teeth. The inner dimensions of the pliable bite valve may be sized relative to the outer dimensions of the housing such that the pliable bite valve slideably engages the primary housing and fits snuggly into place. This snug fit allows for a tight seal between the pliable bite valve and the housing and prevent inadvertent leakage of fluids. Thus, the user may draw fluid out by varying how and where the bite valve is engaged to alter the amount and proportion of each fluid component delivered. As will be appreciated by those skilled in the art, the primary fluid and the secondary fluid may be any gas or liquid chosen for delivery. For example, a primary material can be water while the secondary material is a highly concentrated electrolyte.

A pliable bite valve, first delivery member (such as a hose or tube), secondary delivery member, and the housing may collectively comprise a dispensing apparatus. The dispensing apparatus is configurable to deliver a component, such as a liquid or gas. Additionally, the dispensing apparatus may include a piercing valve that breaks the seal of a sealed secondary delivery member. The secondary component to be delivered is drawn into the pliable bite valve from the secondary delivery member. The pliable bite valve may also include a primary passageway through which the primary component is drawn into the user's mouth from, for example, a reservoir and a secondary passageway through which the secondary component is drawn into the user's mouth from the secondary delivery member.

A control valve that moves, in its entirety, within the dispensing apparatus in response to the manner in which the user manipulates the pliable bite valve may be used. For example, a user applying biting force to a primary bite position may force the control valve to move in one direction and allow the user to receive only the primary material, and the user applying biting force to a secondary bite position may force the delivery control valve to move in a different direction and allow the user to receive the primary material and secondary component. Alternatively, a user could apply a suction force to control the valves. As will be appreciated by those skilled in the art, the force applied to control the valves can be, but is not limited to, a suction and a pressure. Thus any force applied that causes the valve to undergo a change would be suitable particularly where the force is applied in a manner that allows the user to have hands-free control of the operation of the valves. The control valve is a discrete component apart from the pliable bite valve, the housing, the hose, and the secondary material tube.

Figure 1B:
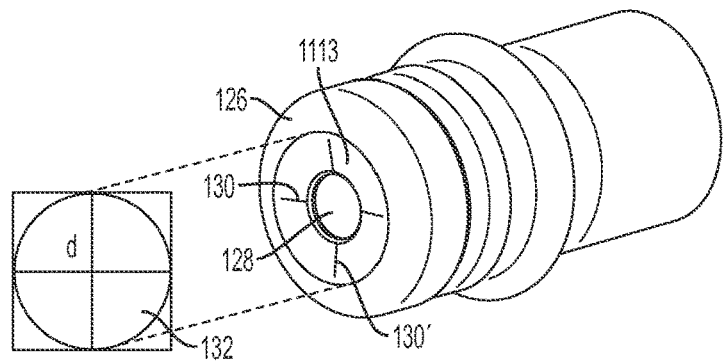
Figure 1C:
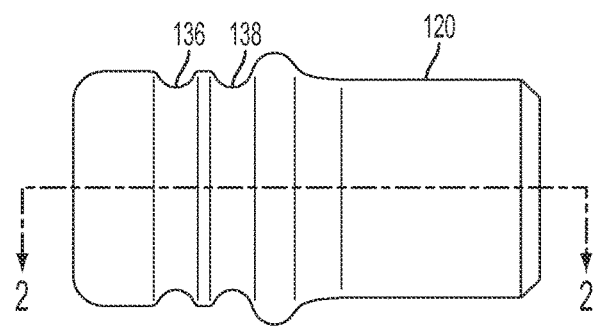

FIGS. 1A-C illustrate a dispensing apparatus 100 includes a pliable valve 120. The dispensing apparatus has a housing 110, a first delivery member 122, shown as a hose for illustration purposes, and a secondary delivery member 124. The pliable valve 120 has a front face 126, and an aperture 128. The front face 126 may, but need not, include two perpendicular slits 130, 130' that divide the front face 126 into four sections 132. When the four sections 132 of the valve front face 126 are in communication, the aperture 128 is sealed to prevent leakage of fluids when the pliable bite valve 120 is not in use. When a force is orally applied to the pliable valve 120, a diameter d of the front face decreases in one dimension and the four sections 132 are displaced. In addition, a mechanism within the pliable valve 120 displaces a plug 134. This creates gaps between the plug 134 and the four sections 132 of the valve front face 126, allowing fluids to flow through the aperture 128 into the user's mouth.

The dispensing apparatus 100 is controllable by applying pressure to a first location 136 or a second location 138 to control access to the first delivery member 122, and/or the secondary delivery member 124 as discussed in further detail below.

The plug 134 can serve a number of purposes. For example, after the user finishes consuming materials from the pliable valve 120, a small volume of fluid may be trapped inside the pliable bite valve 120. If the aperture 128 on the front face 126 of the pliable valve 120 is left open, this leftover material may potentially flow out of the aperture 128 and spill out onto the user, a surface, or equipment. To avoid such spillage, when the pliable valve 120 is manipulated by a user, the plug 134 closes the aperture 128 on the valve front face 126 ensuring that any material still within the pliable valve 120 remains within the bite valve until the bite valve is activated again. The plug 134 can also eliminate the possibility that dirt or other contaminants are introduced into the pliable valve 120 or the reservoirs providing fluid to the valve.

Figure 2:
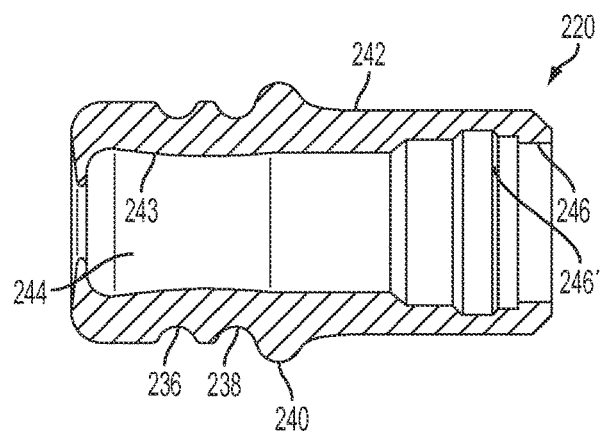
FIG. 2 depicts a cross-sectional view of a pliable bite valve from FIG. 1.

FIG. 2 is a cross-sectional view of the pliable bite valve 120 shown in FIGS. 1A-C taken along the lines 2-2 in FIG. 1C. The outer surface of the pliable bite valve 220 includes a first bite position 236, a second bite position 238, a raised outer rib 240, an outer wall 242, an inner wall 243, and a valve cavity 244. The raised outer rib 240 may aid a user in locating the first bite position 236 and the secondary bite position 238 when the pliable bite valve 220 is placed in the user's mouth. When the user orally applies force to the first bite position 236 or the second bite position 238, the outer wall 242 of the pliable bite valve 220 is depressed, or encroaches, into the valve cavity 244 from at least two directions. The user may draw a first ingredient or material or a combination of the first ingredient or material and second ingredient or material by applying force to the first bite position 236 or the second bite position 238, respectively, which causes control valves that lie within the valve cavity 244 to be manipulated as described in further detail below. The pliable bite valve 220 also may incorporate one or more annular features 246, 246' that may aid in locating the pliable bite valve 220 axially relative to the housing and ensure a tight seal between the two parts.

FIGS. 3A-D illustrate the dispensing apparatus housing 310. The housing 310 includes a primary material inlet 312 whose outer diameter may be slightly larger than the inner diameter of a hose (not shown) that is capable of sliding over the primary material inlet 312. A hose made of a suitable material such as rubber, Tygon® tubing from U.S. Plastic Corp., or a similarly flexible material can be used. The portion of the hose that engages with the primary material inlet 312 may stretch to accommodate the outer diameter of the fluid inlet, ensuring a tight seal between the hose and the fluid inlet 312. The primary material may enter the housing through the primary material inlet 312 from the hose and exit the housing 310 through a housing outlet 314.

As will be appreciated by those skilled in the art a pliable bite valve (as shown in FIG. 2220) may attach to the housing 310 around a ribbed exterior 316 in the form of a grooved exterior surface of the housing outlet 314. The housing 310 may further include a conical fitting 318. The conical fitting 318 may be geometrically equivalent to fittings typically used with medical devices. The geometry of the conical fitting 318 may, for example, be determined by the international standard for 6% (Luer) taper (ISO 594-1 and ISO 594-2). Other geometries and tapers can be used without departing from the scope of the disclosure. The conical fitting 318 may be positioned at a location where the secondary material is introduced into the dispensing apparatus. A receiving rotation stop or detent 319 may be molded into the housing 310 as a mechanism for orienting the secondary member into place and ensuring a tight seal between the two parts, as described in further detail below. A secondary locking slot (not shown) is molded into the housing as a mechanism for locking the secondary member into place (See FIG. 7D for feature received by the housing).

Figure 3A:
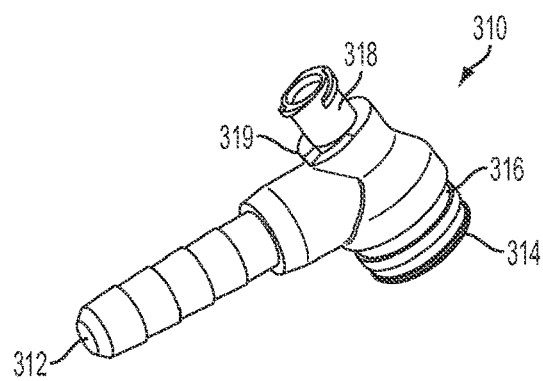
FIGS. 3A-D illustrate a housing for the dispensing apparatus.
Figure 3B:
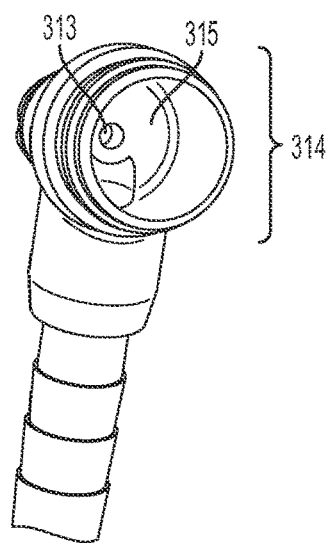
Figure 3C:
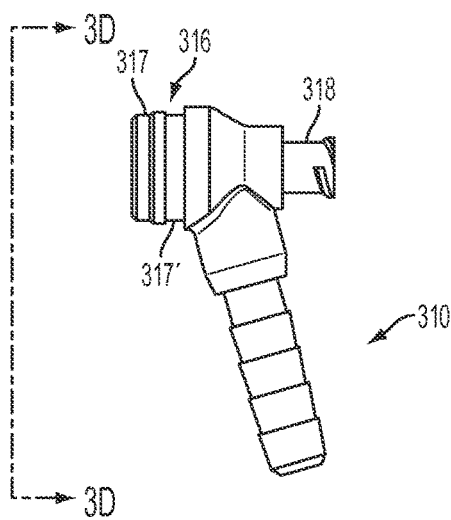
Figure 3D:
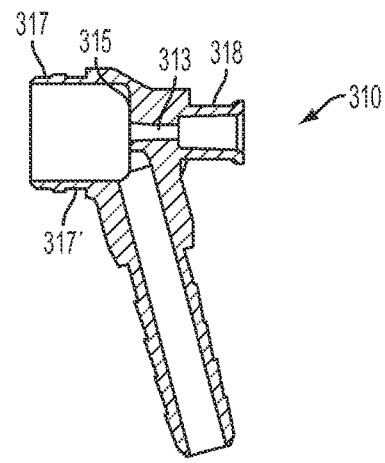

As shown in FIGS. 3B and D, the housing 310 includes a secondary port 313 within a rear wall 315 of the housing outlet 314. The secondary port 313 may be configured to receive, for example, a pin to break the seal on the secondary delivery member 324, as described in further detail below. As shown FIG. 3C, the housing 310 may include annular features 317, 317' to align with analogous features found on the pliable bite valve (see 220 in FIG. 2). As shown in FIG. 3D, a cross-section taken along the lines 3D-3D of FIG. 3C, the housing 310 includes a groove 316 to facilitate secure attachment of a housing cap, as described in further detail below.

Figure 4A:
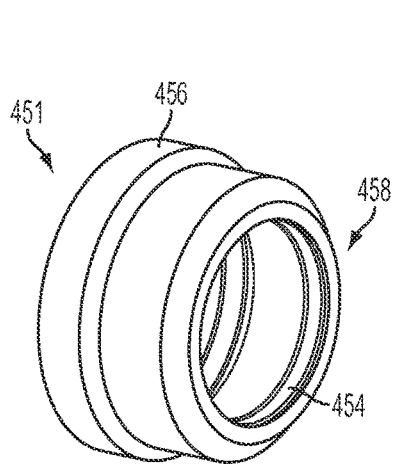
FIGS. 4A-C depict a housing cap.
Figure 4B:
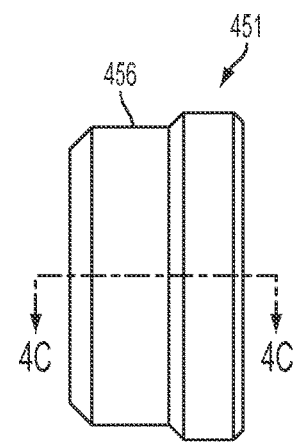
Figure 4C:
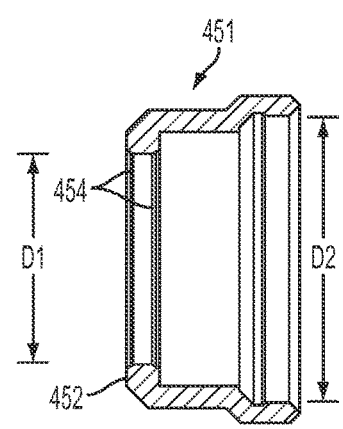

FIGS. 4A-C illustrate a housing cap 451 having a side wall 456 and forming an aperture 458 therethrough. The radius of curvature of the control valve (see below) is slightly less than an inner diameter D1 of the housing cap 451. As shown in FIG. 4C, which is a cross-sectional view taken along the lines 4C-4C of FIG. 4B, the inner diameter D2 within a larger end of the housing cap 451 facilitates attachment to the housing of the dispensing apparatus without binding. The inner diameter can be from 0.25-1.00 inches in diameter, or more preferably from 0.40 to 0.60 inches, or even more preferably 0.525 to 0.528 inches in diameter. The inner diameter of the smaller end is less than the inner diameter of the larger end and can be from 0.15-0.75 inches in diameter, or more preferably from 0.20 to 0.50 inches, or even more preferably 0.25 to 0.391 inches in diameter. The interior of the front edge 452 of the housing cap 451 includes a front bore 454 that engages with a portion of the control valve, as described in further detail below.

Figure 5A:
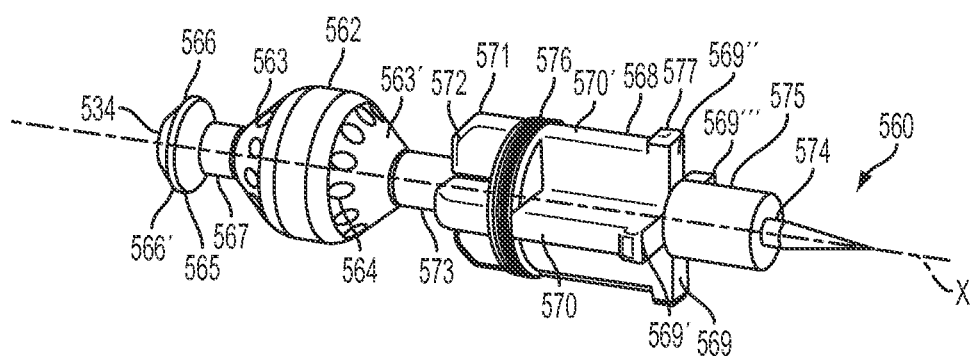
FIGS. 5A-B depict control valves.
Figure 5B:
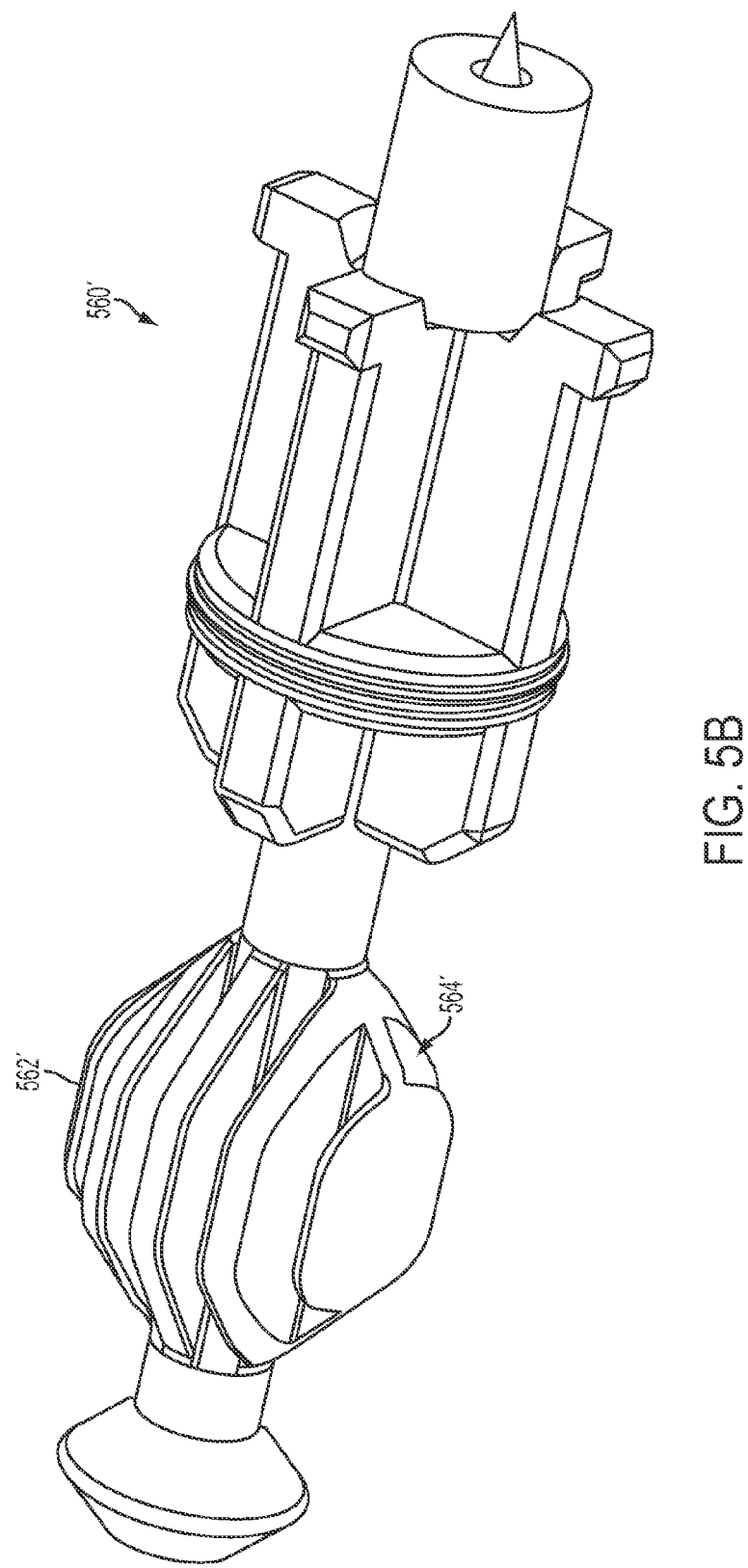

FIGS. 5A-B depict embodiments of a control valve 560 positionable within a delivery apparatus. The control valve 560 may move, in its entirety, in response to the user applying biting force (e.g., to the primary bite position 236 or the secondary bite position 238 shown in FIG. 2). The control valve 560 may include a bite bulb 562. In one configuration, the bite bulb 562 is a cylindrical portion of the control valve 560 that includes angled faces 563, 563' at each end as shown in FIG. 5A-5B. The bite bulb 562 may be oriented such that the angled faces 563, 563' lie directly beneath the primary bite position and the secondary bite position, respectively, on the pliable bite valve. When the user applies force to the primary bite position or the secondary bite position, the outer wall if the bite valve contacts the angled faces 563, 563', of the bite bulb 562 and causes the control valve 560 to translate along the axis X of the pliable bite valve. This axial translation opens ports and allows the user to receive the desired delivered components or combination of delivered components. Because the inner diameter of the pliable bite valve may only be slightly larger than the outer diameter of the bite bulb 562, the volume of the valve cavity between the angled faces 563, 563' may be substantially filled by the bite bulb 562. To facilitate flow of the delivered component through the bite bulb 562, the bite bulb 562 includes passageways 564 oriented parallel to the axis of the control valve 560 and radially spaced around the bite bulb 562. Passageways may also take the form of radially spaced or otherwise stacked fins 564' with channels to achieve the same function. The passageways traverse the bite bulb 562,562' from the first angled face 563 to the second angled face 563' and carry components through the valve cavity. The sum of the cross-sectional areas of the passageways or channels 564' may be equal to or greater than the cross-sectional area of the primary material inlet. Other configurations can be used without departing from the scope of the disclosure. This ensures that fluid may flow through the bite bulb 562, 562' via the passageways 564, 564' and a satisfactory flow of the components may be maintained.

The control valve 560 is configurable to incorporate numerous features to optimize functionality of the dispensing apparatus. The plug 534 is located at the head of the control valve 560. The plug 534 may be of thickness sufficient to close the aperture on the front face of the pliable bite valve (shown in FIG. 1). The outer edge 565 of the plug 534 incorporates two chamfered or rounded edges 566 meeting at a point or apex 566' that defines the outer diameter of the plug 534. The rounded edges 566 allow the plug 534 to pass smoothly through the aperture in the front face of the pliable bite valve (see, 128 of FIG. 1) when the pliable bite valve is manipulated by the user. The plug 534 is connected to the bite bulb 562 via a cylindrical shaft 567. The cylindrical shaft 567 supports the plug 534 and keeps the plug 534 aligned with the rest of the control valve 560. In addition, the cylindrical shaft 567 serves as a bite stop for the user beneath the primary bite position. A bite stop ensures that the user, while applying biting force to the pliable bite valve, does not over bite and collapse the entire valve cavity, thereby hindering flow of materials. Similarly, a cylindrical shaft 573 extends from the other end of the bite bulb 560 and serves as a bite stop for the user beneath the secondary bite position.

The cylindrical shaft 573 connects the bite bulb 562' to a main body 568 of the control valve 560. The main body 568 of the control valve 560 includes four legs 569 oriented perpendicular to each other. Each of the four legs 569 has a length of between 0.25 and 1.25 inches (6.4 mm to 31.8 mm). An outer facing surface 570 of each of the four legs 569 has a radius of curvature such that as the main body 568 passes through the housing cap, the main body 568 is guided in a dominantly concentric and coaxial fashion. A front edge 571 of each of the four legs 569 has a chamfered corner 572. As the user applies biting pressure to the secondary bite position of the pliable bite valve, the main body 568 of the control valve 560 slides axially towards the user. The chamfered corner 572 allows the pliable bite valve to compressed completely down to the cylindrical shaft 573. Without the chamfered corner 572, the motion of the main body 568 may be limited as the main body 568 translated towards the user, because the four legs 569, 569', 569'', 569''' could collide with the pliable bite valve and thereby limit flow.

Located axially at the end of the main body 568 is a pin 574 with a tapered tip. When the user applies biting force to the primary bite position, the control valve 560 moves away from the user such that the pin 574 proceeds through the secondary port (see, 313 in FIG. 3). If the user has applied force to the primary position for the first time since the secondary delivery member was attached to the housing, the pin 574 punctures the secondary delivery member and breaks a seal. The main body 560 of the control valve includes a blocking component 575. When the user orally applies force to the primary bite position and the pin 574 proceeds through the secondary port, the blocking component 575 blocks the flow of secondary material from the secondary delivery member so that the user only receives the primary material (illustrated in further detail in FIG. 6C below). The blocking component 575 may be made of silicone or a similar rubberized material. Towards the end of the main body 568 closest (proximal) to the user, the main body 568 includes a seal 576, which can be in the form of ridges, which engages the front bore of the housing cap, as described in further detail below. At the end of the main body 568 furthest from the user, the diameter of four legs 569 increases to form a step 577. The step 577 serves the purpose of guiding the main body 568 of the control valve and keeping it parallel with the x-axis within the valve cavity.

Figure 6A:
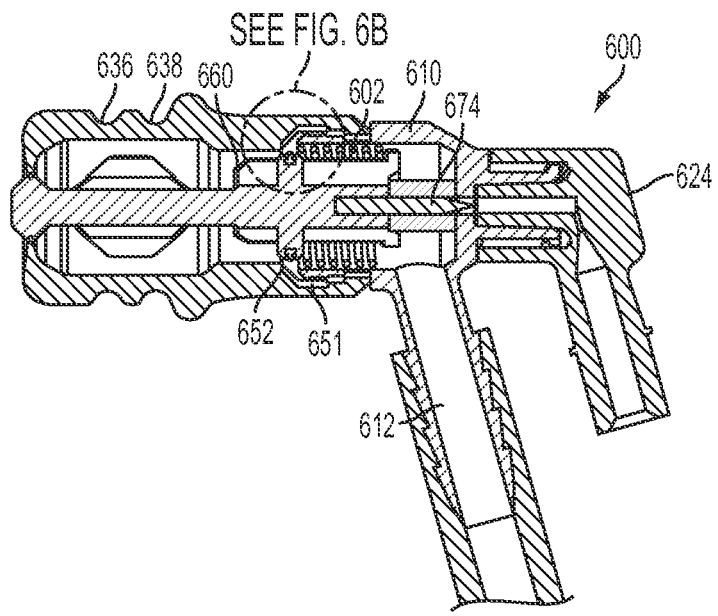
FIGS. 6A-D depict a cross-sectional view of the dispensing apparatus.
Figure 6B:
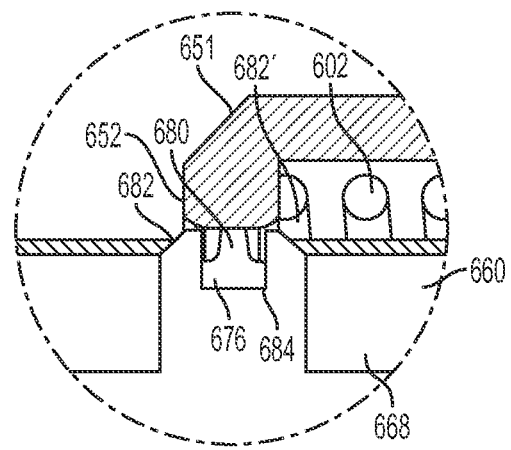
Figure 6C:
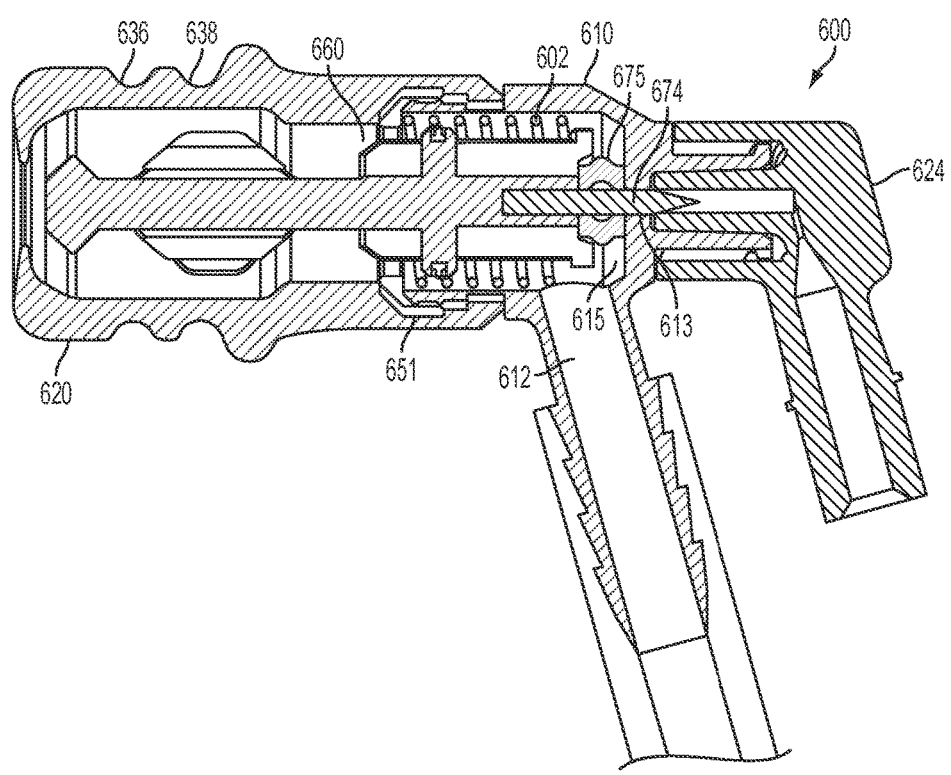
Figure 6D:
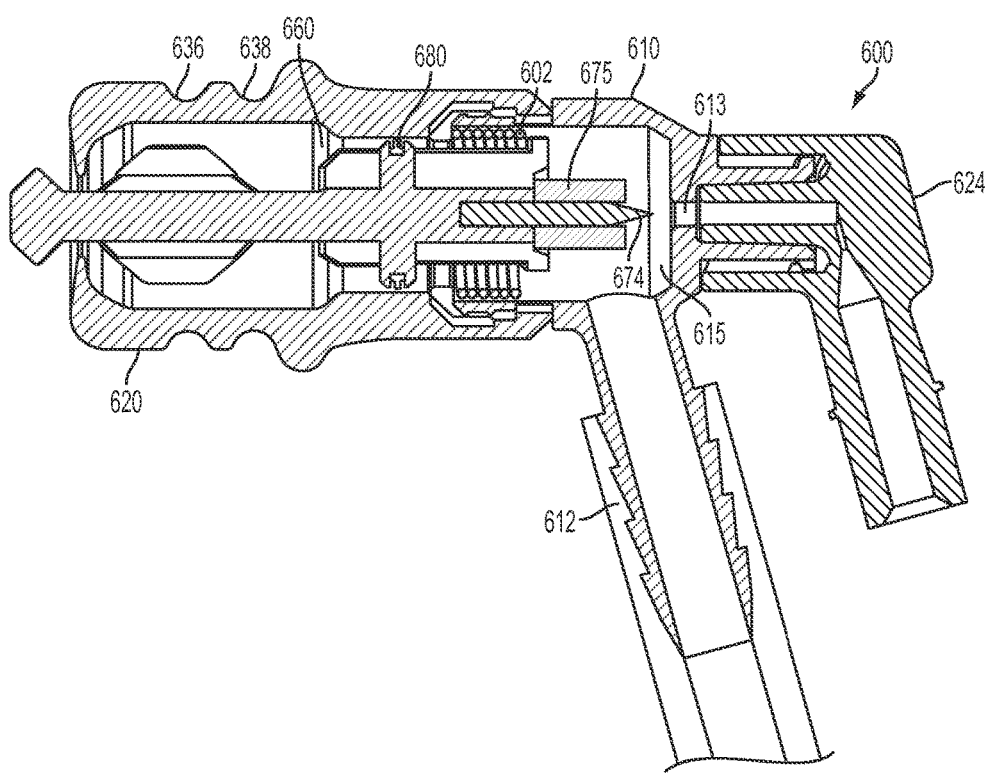

FIGS. 6A-D illustrate cross-sectional views of a dispensing apparatus 600 having the component parts described above as compiled. The control valve 660 within the dispensing apparatus 600. Within the region of coupling between the housing cap 651 and the housing 610, the dispensing apparatus includes a spring 602. When the spring 602 is partially uncompressed (as shown in FIG. 6A), the control valve 660 rests in a home position. As the user orally applies force to the secondary bite position 638, the control valve 660 translates towards the user and the spring 602 is compressed (as shown in FIG. 6D). As the user orally applies force to the primary bite position 636, the control valve 660 translates away from the user and the spring 602 is allowed to extend (as shown in FIG. 6C). Additionally the blocking component 675 is compressed, further ensuring a seal of the secondary material. When the user releases the orally applied pressure, the compressed blocking component forces the spring 602 to return to its normal state and forces the control valve 660 back to the home position (FIG. 6A). The end of the spring 602 proximal to the user is engaged with the interior of the front edge 652 of the housing cap 651. The front bore (see 454 in FIG. 4) within the front edge 652 engages with the seal 676 of the control valve 660, which is illustrated further in FIG. 6B.

As shown in FIG. 6B, an annular groove 684 is located in the main body 668 of the control valve 660. The annular groove 684 is shaped such that seal 676 may engage with the annular groove 684 or be molded into the main body 668 of the control valve. When the main body 668 is in a home or resting position, the seal 676 rests inside the front bore 654 of the housing cap 651. The interaction between the seal 676 and the housing cap 651 creates a fluid tight seal, thus ensuring that no material flows through the system until drawn by the user. When the spring 602 is allowed to expand, a primary valve 680 opens, allowing the primary material to flow through the pliable bite valve 620 as shown in FIG. 6C. When the control valve 660 is resting in a home or first position, the primary valve 680 is closed, preventing the flow of any material through the pliable bite valve 620. The annular groove 684 includes outer edges 682 that are chamfered to minimize the amount of travel required by the main body 668 of the valve before material may begin to flow.

As shown in FIG. 6C when the control valve 660 is distal to the user (i.e., away) the spring 602 is extended. As the control valve 660 translates away from the user, the pin 674 is driven into the secondary port (see 313 in FIG. 3) and the blocking component 675 is compressed between the main body 668 of the control valve and the rear wall 615 of the housing 610. The compression of the blocking component 675 (which can be a seal, grommet, or suitable compressible material) further increases the sealing of the secondary port, thus ensuring that only the primary material flows through the pliable bite valve 620. When the user releases the orally applied pressure, the compressive force of the blocking component 675 compresses the spring 602 and returns the spring 602 to its normal state. Consequently, the control valve 660 is returned to a home position.

In FIG. 6D, the dispensing apparatus 600 is illustrated when the control valve 660 is oriented towards the user and the spring 602 is compressed. As the control valve 660 translates towards the user, the pin 674 is pulled out of the secondary port 613 and the blocking component 675 recedes from the rear wall (see 315 in FIG. 3) of the housing 610. This allows the secondary material to flow from the secondary delivery member 624 and mix with the primary material flowing from the primary inlet 612. As the user applies suction to the pliable bite valve (such as 220 in FIG. 2), a pressure differential is created across the open primary material valve 680 and both the primary and secondary materials flow through the pliable bite valve 620 into the user's mouth. When the user releases oral pressure, the force of the spring 602 causes the control valve 660 to return to a home position.

Figure 7A:
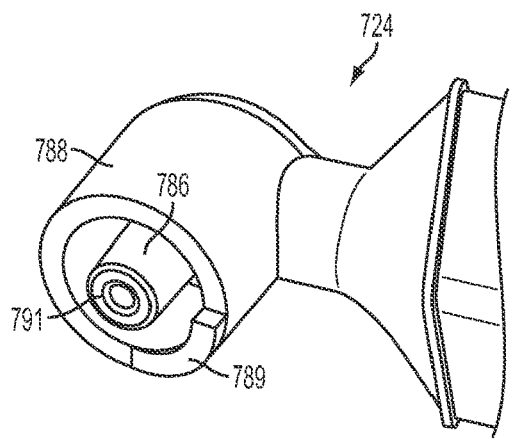
FIGS. 7A-D illustrate a secondary material member.
Figure 7B:
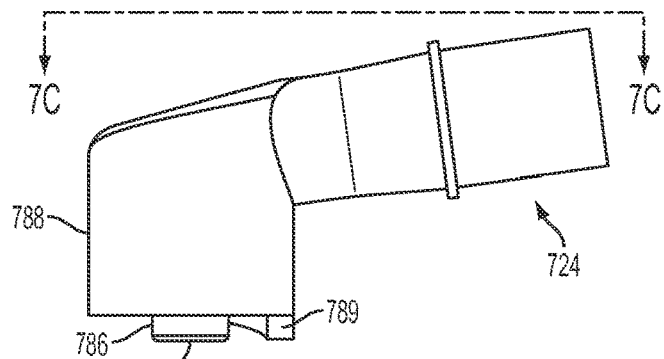
Figure 7C:
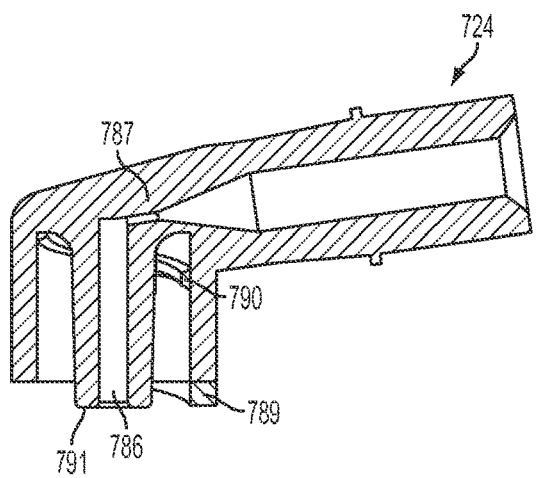

FIGS. 7A-D illustrate the secondary delivery member 724. The secondary delivery member 724 engages with the conical fitting of the housing (shown in FIG. 3A). The secondary delivery member includes a secondary material outlet 786 that engages with the conical fitting as a male component by fitting within the interior of the conical fitting, which serves as a female component. As shown in FIG. 7C, which is a cross-sectional view taken along the lines 7C-7C in FIG. 7B, the secondary material outlet 786 is surrounded by an exterior casing 788 that includes a rotation stop 789. A flat region 791 of the secondary material outlet 786 may initially be covered by a seal (not shown), which is pierced by the pin (shown in FIGS. 5 and 6) when oral pressure is applied to the primary bite position. Every time the user orally applies force to the primary bite position, the piercing action recurs to ensure the seal remains open. Alternatively the piercing action can be manually actuated (not orally) by suppressing the front of the plug forcing the pin it into the material outlet 786.

Figure 7D:
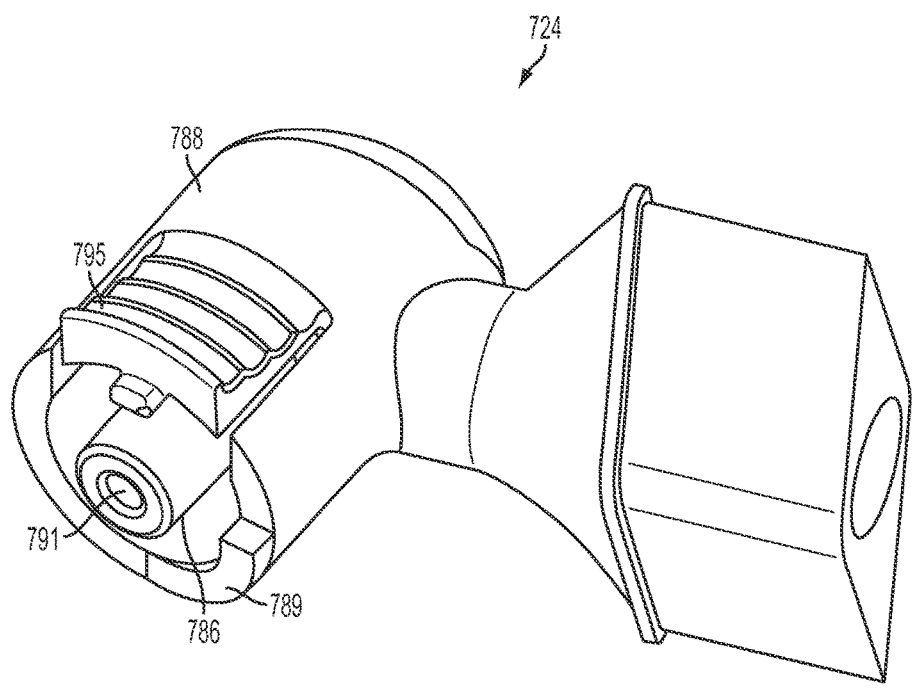

As illustrated, the secondary delivery member 724 includes a reduced diameter region 787. The reduced diameter region 787 limits the flow of the secondary material from the secondary delivery member 724. The reduced diameter region 787 prevents excessive amounts of the secondary material from mixing with the primary material and allows the user to draw a predetermined combination of the primary material and the secondary material. The secondary delivery member 724 includes a receiving thread 790 that engages with threads on the conical fitting. As shown in FIG. 7d, a locking mechanism 795 can be provided which enables the secondary delivery member 724 to be secured to the dispensing apparatus housing (see 310 in FIG. 3).

As the secondary material is evacuated from the secondary material tube, the volume of the secondary material tube is reduced. As the volume of the secondary material tube is reduced, the secondary material tube may be configured such that the tube collapses upon itself. If this effect is not accounted for, collapsing of the secondary material tube near the point of coupling between the secondary material tube and the housing may limit the flow of secondary material into the housing. This effect may be accounted for by lining the interior of the secondary material tube with one or more longitudinal ribs. The secondary material tube may also incorporate one or more annular ribs that protrude beyond the major outer dimension of the tube and project longitudinally along the length of the tube in a helical fashion. The helical orientation of the ribs would allow the secondary material tube to remain flexible, yet as the volume of the secondary material tube is depleted and the secondary material tube collapses, the annular groove would still provide a path for the secondary material to flow through the secondary material tube and into the housing. This may also be achieved by, for example, placing an extrusion with a profile similar to a star inside the secondary material tube. In the event that the secondary material tube collapses prematurely, trapping fluid inside, the secondary material tube would collapse onto the peaks of the extrusion and the valleys of the extrusion would maintain an open fluid path for fluid to exit on demand.

Figure 8A:
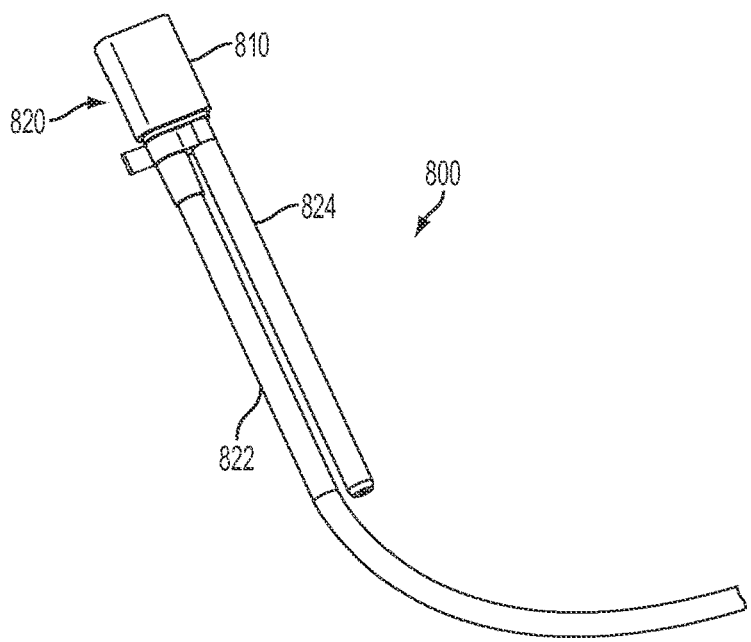
FIGS. 8A-C depict another dispensing apparatus configuration.
Figure 8B:
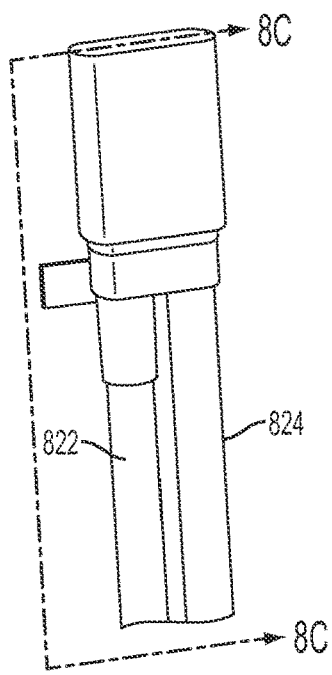
Figure 8C:
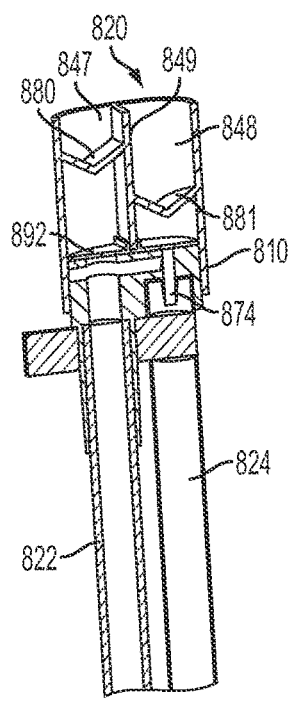

FIGS. 8A-C illustrate a dispensing apparatus 800. The dispensing apparatus 800 includes a primary material delivery member 822 and a secondary material delivery member 824 coupled to a pliable bite valve 820. The secondary material delivery member 824 and the primary delivery member 822 may be coupled to the pliable bite valve 820 within a housing 810. The secondary material delivery member 824 may include a seal that, if unbroken, indicates that the delivery member has not been opened or otherwise contaminated. Turning to FIG. 8C, a cross-section of the dispensing apparatus 800 is illustrated taken along the lines 8C-8C in FIG. 8B. The pliable bite valve 820 includes a primary passageway 847 and a secondary passageway 848 separated by a vertical wall 849. The primary passageway 847 and the secondary passageway 848 include a primary valve 880 and a secondary valve 881, respectively. The primary valve 880 restricts the flow of the primary material from a reservoir (not shown) through the primary delivery member 822 and the primary passageway 847. The secondary valve 881 restricts the flow of the secondary material from the secondary material delivery member 824 through the secondary passageway 848. As the secondary material delivery member 824 is coupled to the pliable bite valve 820, a piercing member 874 within the housing 810 breaks the seal on the secondary material delivery member 824 and allows the secondary material to be drawn through the secondary passageway 848. The housing 810 includes a backflow valve 892 that isolates the primary material and the secondary material from each other and ensures that no mixing of the materials occurs within the housing 810 at the point of coupling between the pliable bite valve 820, the primary delivery member 822, and the secondary material member 824.

Figure 9A:
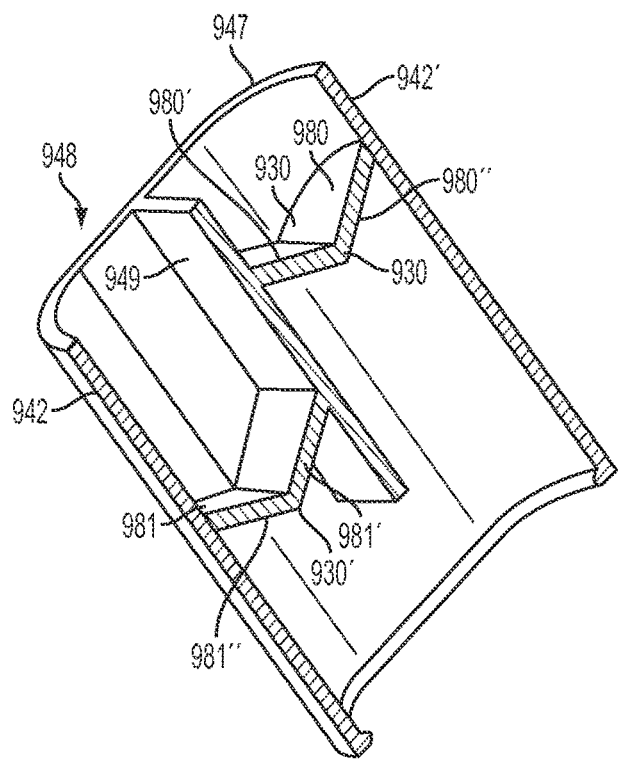
FIGS. 9A-B depict a cross-sectional view of a primary passageway and a secondary passageway of a bite valve.
Figure 9B:
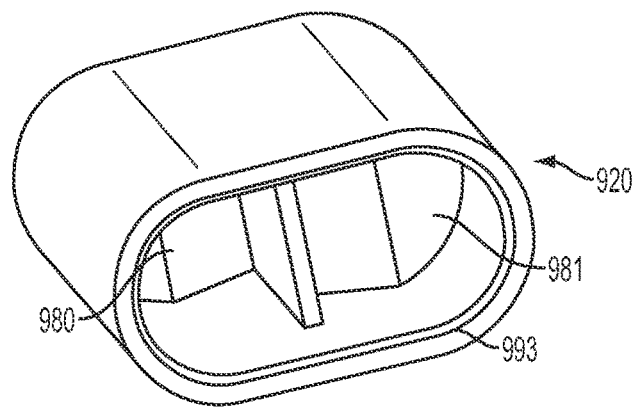

FIGS. 9A-B illustrate the primary passageway 947 and the secondary passageway 948 within the pliable bite valve 920. The primary valve 980 within the primary passageway 947 includes primary valve components 980', 980" that are oriented angularly with respect to each other, the vertical wall 949, and a primary outer wall. Similarly, the secondary valve 981 within the secondary passageway 948 includes secondary valve components 981', 981" that are oriented angularly with respect to each other, the vertical wall 949, and a secondary outer wall. The primary valve components 980', 980" and the secondary valve components 981', 981" form primary and secondary valve slits 930, 930', respectively. The pliable bite valve 920 also may incorporate one or more annular ribs 993 along the point of coupling between the pliable bite valve 920 and the housing 910. The annular ribs 993 may aid in locating the pliable bite valve 920 axially and radially relative to the housing (see, 810 of FIG. 8A). In addition, the annular ribs 993 may ensure a tight seal between the pliable bite valve 920 and the housing and prevent inadvertent leakage of fluids. The pliable bite valve 920 may be covered using a cap (not shown) to prevent dust or dirt from entering the area.

Figure 10A:
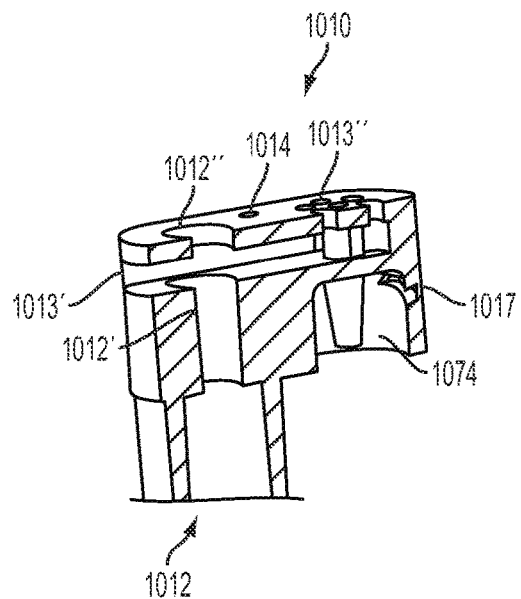
FIGS. 10A-C depict a housing.
Figure 10B:
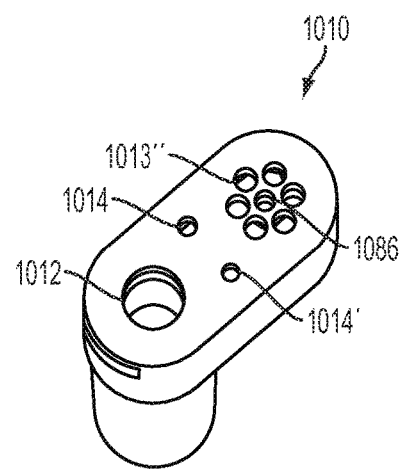
Figure 10C:
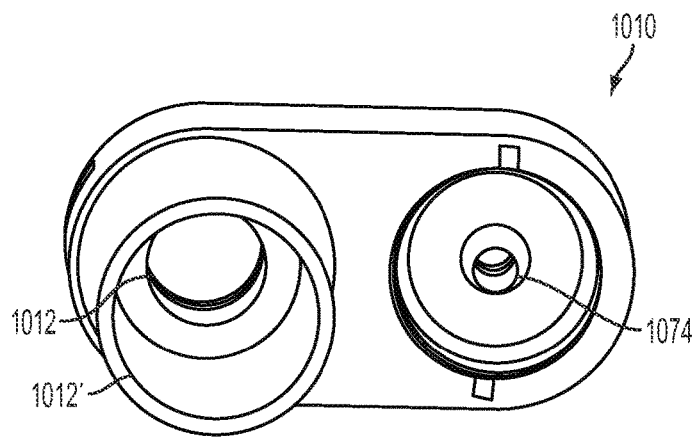

FIGS. 10A-C illustrate a cross-sectional view of the housing 1010. The housing 1010 includes a primary material inlet 1012. The primary delivery member (such as 822 in FIG. 8) may attach to the primary material inlet 1012. The inside of the primary material inlet 1012 may include threads, ridges, or any other mechanism for ensuring a secure connection between the housing 1010 and the primary delivery member. The housing 1010 may include a receiving groove 1017 to facilitate a secure connection between the housing 1010 and the secondary material member (such as 824 in FIG. 8). A soft seal or an O-ring (not shown) may be used to further ensure a tight seal between the housing 1010 and the secondary material member. The housing 1010 may include a primary material channel 1012' oriented axially relative to the primary material inlet 1012. The primary material channel 1012' may lead to a fluid connecting port 1013' oriented perpendicularly relative to the primary material inlet 1012 and the primary material channel 1012'. The top of the housing 1010 may include a singular primary material outlet 1012", back flow valve receivers 1014, 1014', a dispersed primary material outlet 1013''', and a secondary material outlet 1086. The primary material may be drawn from, for example, a reservoir (not shown) through the primary material inlet 1012, the primary material channel 1012', and the singular primary material outlet 1012" into the pliable bite valve (such as 820 in FIG. 8). The primary material may be drawn through the primary material inlet 1012, the primary material channel 1012', the fluid connecting port 1013', and the dispersed primary material outlet 1012''' into the pliable bite valve (see 920 in FIG. 9). When drawn through the dispersed primary material outlet 1012', the primary material may mix (e.g., in the pliable bite valve 820 shown in FIG. 8) with the secondary material drawn through the piercing valve 1074 and the secondary material outlet 1086.

Figure 11:
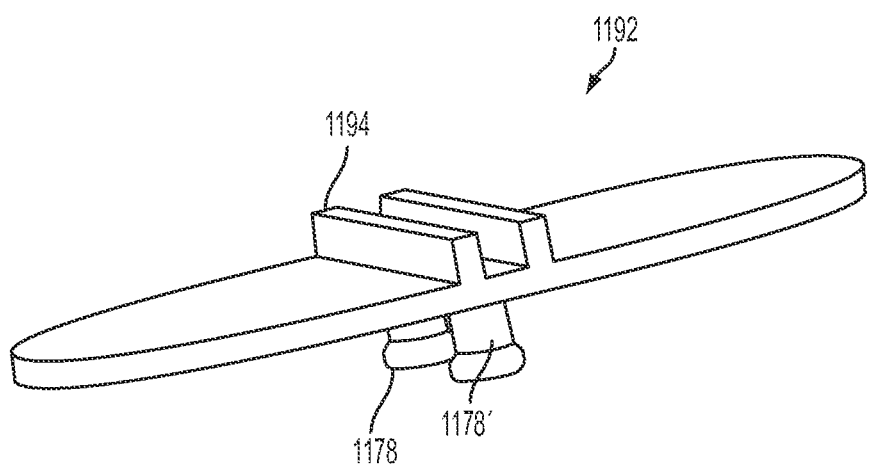
FIG. 11 depicts a backflow valve.

FIG. 11 illustrates a backflow valve 1192 which includes cylindrical posts 1178, 1178' that may be received by the back flow valve receivers (such as 1014, 1014' in FIG. 10) of the housing (such as 1010 in FIG. 10) to ensure a secure connection between the backflow valve and the housing. Cylindrical posts 1178, 1178' may have enlarged radial ends to further ensure a tight and secure fit. The cylindrical posts 1178, 1178' are oriented beneath elevated ribs 1194, which extend upward into the pliable bite valve. As the pliable bite valve is installed over the exterior of the housing, the end of the vertical wall (such as 949 in FIG. 9) fits between the pair of elevated ribs 1194. The orientation of the vertical wall to the elevated ribs 1194 acts as a seal between the primary passageway and the secondary passageway and also holds the backflow valve 1192 firmly in place against the housing.

When one valve is acted upon, the other valve can remain in the closed position. This may be achieved by varying the thickness of the vertical wall at appropriate locations axially along the length of the pliable bite valve. The thinner sections may isolate the biting/pinching action of the user to one passageway of the pliable bite valve and prevent undesired pressure from being applied to the other passageway. Non-planar shapes of the vertical wall can be utilized to facilitate preferential collapsing of the vertical wall when the pliable bite valve is manipulated by the user. Any geometry that effectively creates a concave structure relative to the valve being acted upon may be used. Preferential collapsing may aid in ensuring that the primary valve components and secondary valve components, shown in FIG. 9, open optimally and allow maximum flow.

The act of drawing upon the pliable bite valve may create a vacuum or suction effect, causing a pressure differential. Because the primary valve and secondary valve share a common housing (i.e., the pliable bite valve), any vacuum or suction created by the user is distributed evenly over the surface of both the primary valve and secondary valve. As a result, materials are delivered to the user based on the location and degree of pressure applied by the user on the pliable bite valve. In the passageway through which fluid is not desired and in which the valve is not being deformed, the relative angle between the valve components forces the valve components towards each other, thus creating a physical sealing effect on the valve slit. This effect aids in ensuring that only the desired fluid is delivered on demand. The primary valve and secondary valve may incorporate ribs of varying thicknesses to facilitate the primary and secondary valve slits parting and opening in the optimal orientation as well as ensuring an adequate seal when necessary.

The exterior surface of the pliable bite valve may be covered in a varying texture. The texture may include gradual changes or variations in pattern on different exterior portions of the pliable bite valve. The varying texture may provide the user with an indication of the proximity of the primary valve and the secondary valve relative to each other and thus enable the user to operate the desired valve and draw the desired material.

The pliable bite valve may be replaced with a mouthpiece that includes pressure-sensitive valves. Pressure-sensitive valves operate solely on pressure differentials and do not require contact by the user's teeth or lips. These valves would open or close based on the level of suction applied by the user and would not require physical manipulation to operate. For example, if the user chooses solely to drink the primary material, the user may apply a level of suction below a pre-determined threshold. If the user chooses to drink a mixture of the primary and secondary material, the user may then apply a level of suction above the predetermined threshold.

The primary and secondary materials may also mix on demand. To facilitate this, the primary material may be drawn from the reservoir through the primary material inlet, the primary material channel, the fluid connecting port, and the dispersed primary material outlet into the pliable bite valve. The secondary material may be drawn from the secondary material member, through the piercing valve and the secondary material outlet and into the pliable bite valve. The two materials may then be mixed, e.g., via turbulent flow, as they pass into the pliable bite valve and into the users mouth. The ratio of the secondary material that is introduced into the primary material may depend on a variety of factors, such as the viscosity of the fluids, ability of the secondary delivery member to collapse under a vacuum to displace the volume of the secondary materials being delivered, and the number and size of the apertures that comprise the dispersed primary material outlet and the secondary material outlet. The housing may be customized by varying the size and location of the apertures based on, for example, the viscosity of the fluids used. For example, different versions of the housing may be sold for use with sports drinks, powdered drinks, concentrated solution, or any other liquid.

While the primary valve and secondary valve in the pliable bite valve control the delivery of material to the user, the backflow valve 1192 isolates the two different material paths (shown, for example, in FIG. 9) and ensures that materials are not shared between primary passageway and the secondary passageway. The backflow valve 1192 can also be constructed from a pliable, low Durometer elastomer or silicone, thus allowing the portions on either side of the pair of elevated ribs 1194 to flex when acted upon by a pressure differential. The backflow valve 1192 can also be molded or integrally formed directly into the pliable bite valve and be made from the same material as the pliable bite valve itself.

When the pliable bite valve is manipulated to allow, for example, the primary material to pass through it, suction or a pressure differential is applied by the user. This pressure differential may act on all possible fluid paths equally. Since, in this example, the pressure differential may aid in holding the secondary valve closed, the pressure differential may primarily act on the backflow valve 1192. This effect may lift the backflow valve 1192 off the singular primary material outlet that it had been sealing and route the primary material through the fluid connecting port and the dispersed primary material outlet. As a result, the primary material may flow through the pliable bite valve and into the user's mouth. However, because the pressure differential may also act on the fluid connecting port due to the lack of deformation on the primary passageway, a vacuum may be applied to the dispersed primary material outlet. This vacuum may physically suck the backflow valve 1192 down onto the dispersed primary material outlet and prevent any of the already mixed or unmixed primary or secondary material or air from flowing back into the housing and tainting the intended supply of fluid or preventing adequate vacuum from being applied. Conversely, if the secondary material is desired, the vacuum may be applied to the backflow valve 1192 on the secondary material side, lifting it and allowing the primary and secondary material to flow. This effect may result in the backflow valve 1192 being sucked down onto the singular primary material outlet and prevent any backflow of fluid or air into the system.

The pliable bite valve may slide over the outside of the housing. Additionally, the pliable bite valve may also seal off the fluid connecting port shown in FIG. 10A. This fluid connecting port may also allow for improved access to the inside of the housing, which may aid in cleaning and sterilization if necessary.

The dispensing apparatus may be oriented angularly. The pliable bite valve may be substantially perpendicular to the hose and the secondary material tube. The user may draw variable proportions of the primary material and the secondary material by gripping, using teeth or lips, the dispensing apparatus at different positions axially along the pliable bite valve. The pliable bite valve may include an outer shell, an inner vertical wall, and a smooth, curved front face. The outer shell may incorporate numerous features to aid in bite alignment, valve rebound, and ensure consistent flow of secondary material through the bite valve.

Figure 12A:
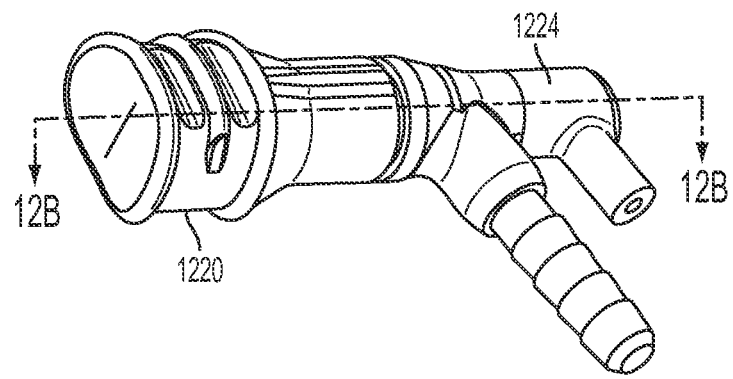
FIGS. 12A-B is a perspective view of another dispensing apparatus and a cross-sectional view.
Figure 12B:
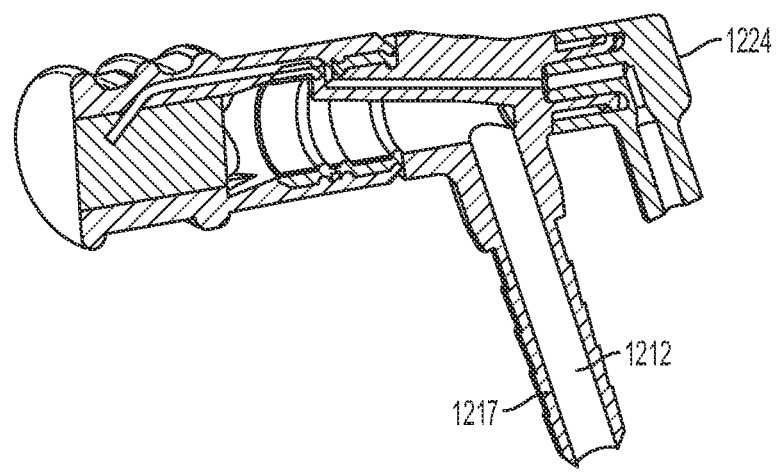

FIGS. 12A-B illustrate a pliable bite valve 1220, having a housing and a secondary material delivery member 1224. The housing includes a primary material inlet 1212. A first delivery member, such as a hose (not shown), may be coupled to the primary material inlet 1212 and a reservoir (not shown) may be provided to supply the primary material to the user through the pliable bite valve 1220. The primary material inlet 1212 may include ridges 1217 to facilitate a secure connection between the primary delivery member and the housing.

Figure 13A:
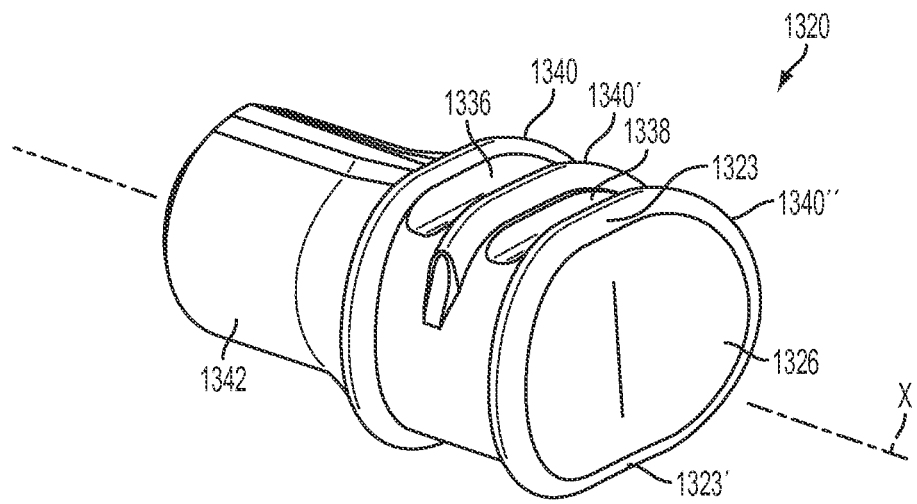
FIGS. 13A-B depict a perspective view of a pliable bite valve and a top view.
Figure 13B:
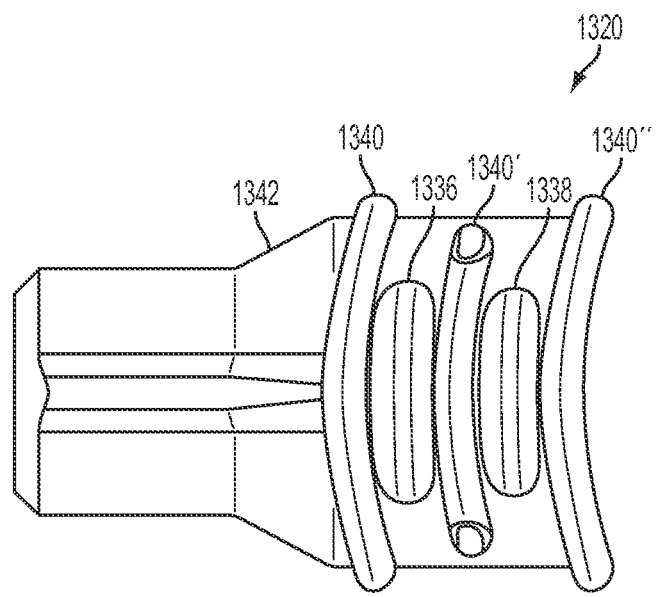

FIGS. 13A-B illustrate a pliable bite valve 1320 having an oval cross-sectional shape. The pliable bite valve 1320 includes an outer shell 1342, a face 1326, a primary bite position 1336, a secondary bite position 1338, and bumps 1340, 1340', 1340". The bumps 1340, 1340', 1340" may each serve a distinct purpose. The bump 1340" defining the front edge of the pliable bite valve 1320 and the bump 1340 furthest from the face 1326 of the pliable bite valve 1320 may both serve the purpose of improving rebound of the valve after the valve is manipulated by the user. The bump 1340' located in between the primary bite position 1336 and the secondary bite position 1338 may help inform the user as to which bite position the user's teeth or lips have engaged and help the user differentiate between the two positions. The main body portion of the pliable bite valve 1320 (i.e., the portion manipulated by the user) has an oval shape comprising two rounded sides connected by the tangent faces 1323, 1323'. The user may receive the primary material or a combination of the primary material and the secondary by engaging teeth with the primary bite position 1336 or the secondary bite position 1338, respectively. The primary bite position 1336 and the secondary bite position 1338 may be positioned in a curvilinear fashion oriented perpendicularly to a primary axis X of the pliable bite valve 1320.

Figure 14A:
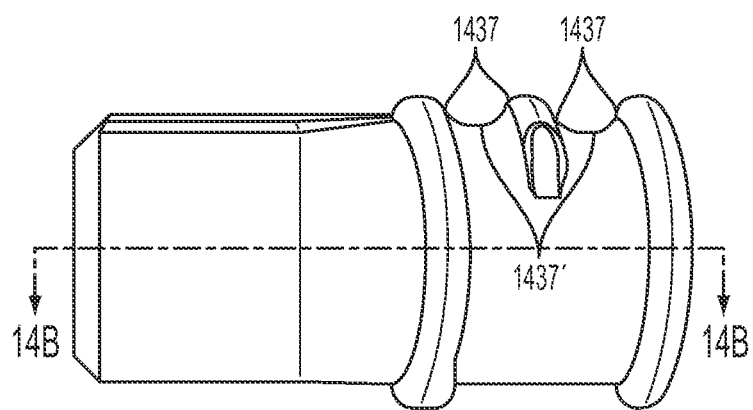
FIGS. 14A-B depict a side view of the pliable bite valve and a cross-sectional view.
Figure 14B:
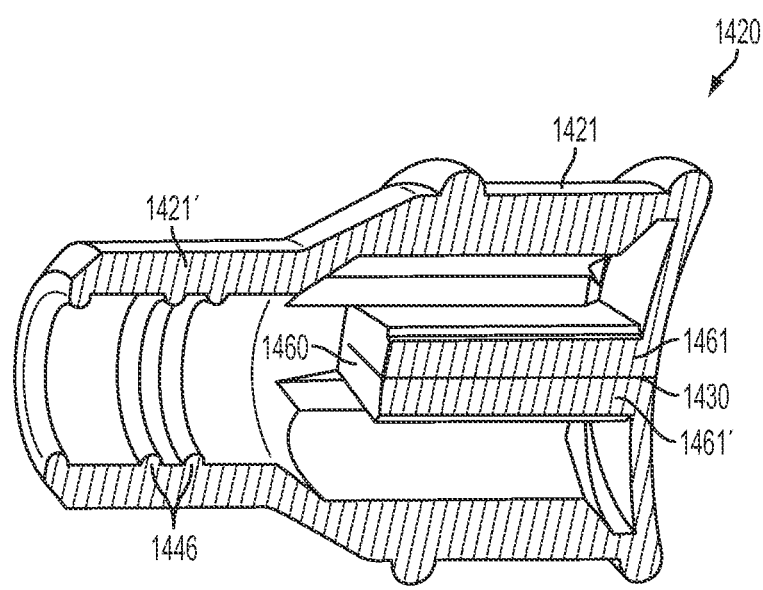

FIGS. 14A-B illustrate a pliable bite valve 1420. Each of the bite positions includes radiused edges 1437 and flat bottom portions 1437'. The radiused edges 1437 and the flat bottom portions 1437' allows the radius of curvature of each of the first bite position 1436 and the second bite position 1438 to resemble the average curvature of an adult's front dental arch. The pliable bite valve 1420 includes a control valve 1460 comprising vertical walls 1461, 1461'. The vertical walls 1461, 1461' form a slit 1430 that, when open, creates a primary material path (not shown) and allows the primary material to flow from a reservoir or source through the pliable bite valve 1420. The vertical walls 1461, 1461' may not have uniform thickness. They may be tapered, with the thinnest portion at the outermost interface with the main body of the pliable bite valve 1420, and the thickest portion in the region of the valve axis. The pliable bite valve 1420 comprises two portions: a larger oval portion 1421 and a smaller circular portion 1421'. The larger oval portion 1421 transitions to the smaller circular portion 1421', which engages with the housing. The smaller circular portion 1421' may also incorporate one or more annular features 1446 that may aid in locating the pliable bite valve 1420 axially relative to the housing and ensure a tight seal between the two parts.

Figure 15:
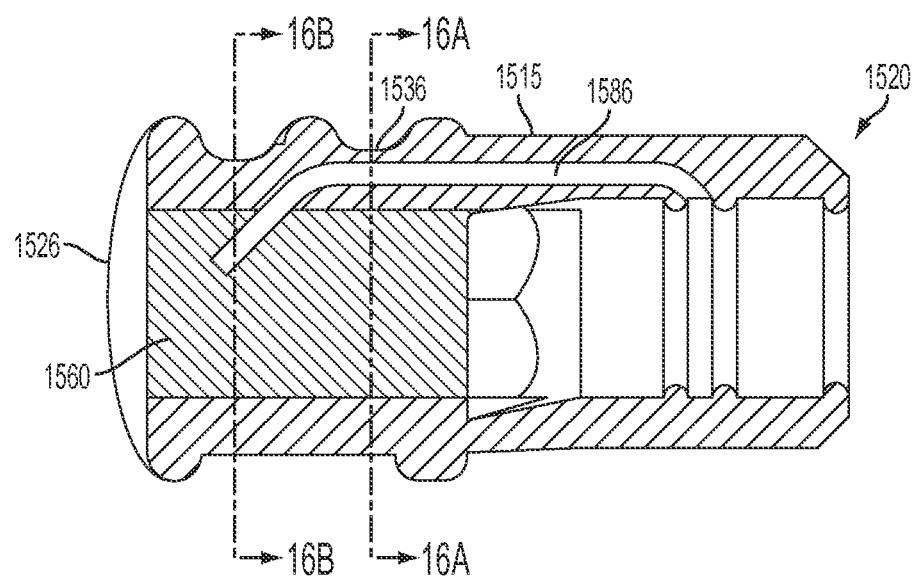
FIG. 15 depicts a cross-sectional view of the pliable bite valve.

FIG. 15 illustrates the pliable bite valve 1520 includes a secondary material path 1586, through which the secondary material may be drawn from the secondary material delivery member into the control valve 1560, and an upper wall 1515. The secondary material path begins at the point of coupling between the pliable bite valve 1520 and the housing, travels through the upper wall 1515, and terminates inside the control valve 1560. Because the secondary material path is oriented in close proximity to the primary bite position 1536, the wall between the secondary material path and the primary bite position 1536 is thin. This allows the user to close off the secondary material path by positioning teeth or lips at the primary bite position 1536 and thereby receive only the primary material, as described in further detail below. When viewed from the top or bottom, the face 1526 of the pliable bite valve 1520 can appear concave in shape. When viewed from the side the face 1526 can appear flat and oriented perpendicular to the axis of the pliable bite valve 1520.

Figure 16A:
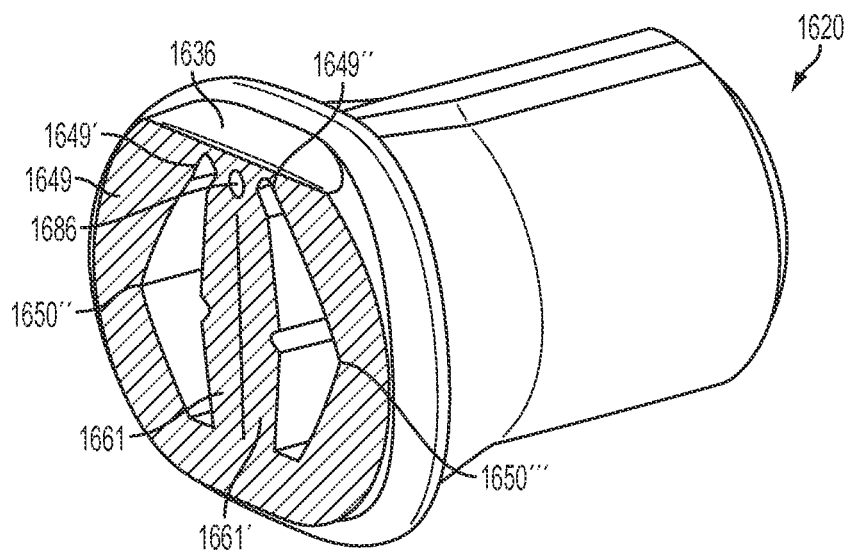
FIGS. 16A-B depict a cross-sectional view of the pliable bite valve at the site of a primary bite position and at a secondary bite position.
Figure 16B:
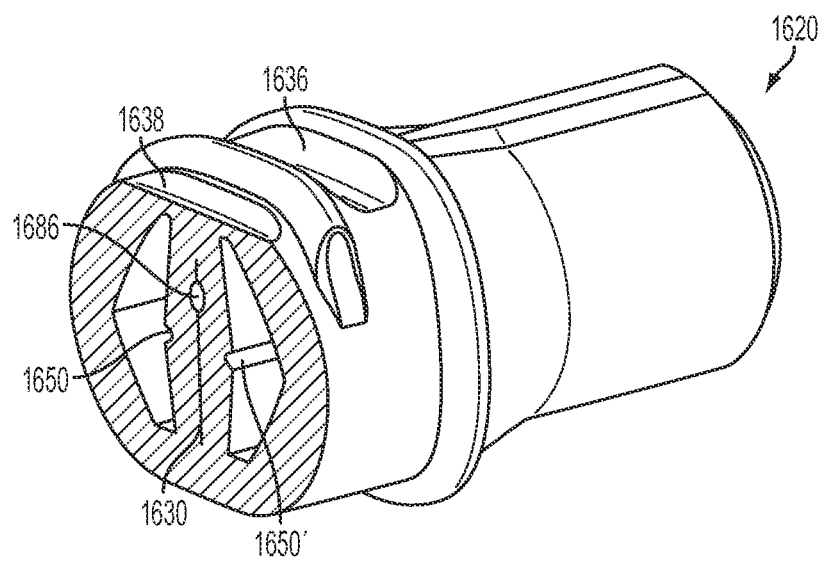

FIGS. 16A-B are views of the pliable bite valve 1620 taken along a cross-section at the site of the primary bite position 1636 (FIG. 16A) along the lines 16A-16A in FIG. 15 and at the site of the secondary bite position 1638 (FIG. 16B) along the lines 16B-16B in FIG. 15. The outer sides of the vertical walls 1661, 1661' include one or more cutouts 1649, 1649", respectively, on the adjacent sides of the apertures allowing for weakened walls surrounding the secondary material path 1686. The cutouts 1649, 1649" facilitate the closure of the secondary material path 1686 in response to minimal biting force applied by the user to the primary bite position 1636. The vertical walls 1661, 1661' include small grooves or channels 1650, 1650', respectively, to facilitate the collapse of the vertical walls 1661, 1661' in response to the orally applied force at the primary bite position 1636. The outer walls 1649 of the pliable bite valve 1620 include bending points 1650", 1650'. Because the outer walls 1649 are thicker than the vertical walls 1661, 1661', they may require more biting force to bend than the vertical walls 1661, 1661' absent the bending points 1650". The bending points 1650" further facilitate the collapse of the vertical walls 1661, 1661' by equalizing the biting force needed to bend the outer walls 1649 of the pliable bite valve 1620 with the amount of biting force needed to collapse the vertical walls 1661, 1661'.

When the user applies biting force at the primary bite position 1636, the secondary material path 1686 may close and the vertical walls 1661, 1661' may collapse, opening the slit 1630 and allowing only the primary material to flow through the pliable bite valve 1620 and into the user's mouth. The secondary material path 1686 shifts downward and merges with the slit 1630 as it proceeds towards the secondary bite position 1638. As the user draws upon the pliable bite valve 1620 while applying biting force to the secondary bite position 1638, suction is applied to the secondary material path 1686 and the primary material path (created by the collapse of the vertical walls 1661, 1661' and the opening of the slit 1630). Thus, when the user applies biting force at the secondary bite position 1638 while drawing upon the pliable bite valve 1620, the vertical walls 1661, 1661' collapse and the secondary material path 1686 remains open, allowing the user to receive a combination of the primary material and the secondary material.

Because the control valve may be triggered from two different biting positions on the pliable bite valve 1620, the manipulation of the pliable bite valve 1620 at one position may need to take effect over the entire length of the pliable bite valve 1620 to ensure primary material flow regardless of bite position. To facilitate this, the thickness of the outer walls 1649 may be increased in specific areas. Thus, the outer walls 1649 may be thicker further away from the bending points 1650, 1650'. Because the outer walls 1649 are thinnest at the bending points 1650, 1650', bending occurs at the bending points 1650, 1650' when the pliable bite valve 1620 is manipulated.

Figure 17A:
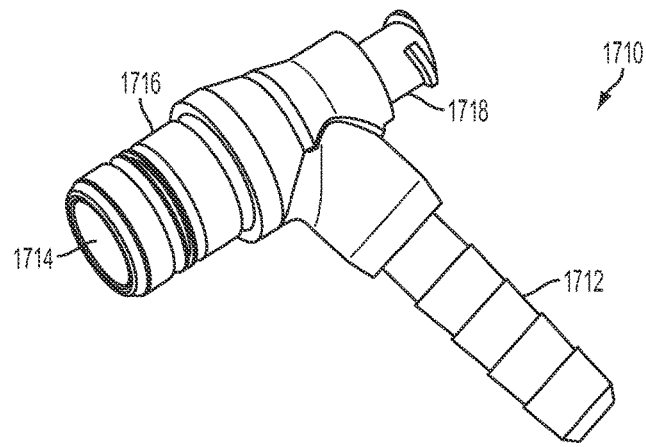
FIGS. 17A-C depict a housing from a perspective, side and cross-sectional view.
Figure 17B:
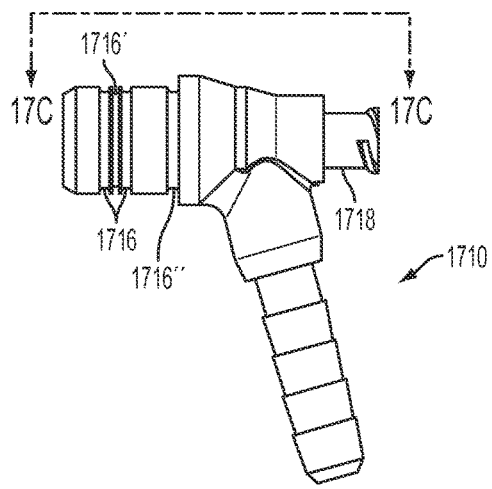
Figure 17C:
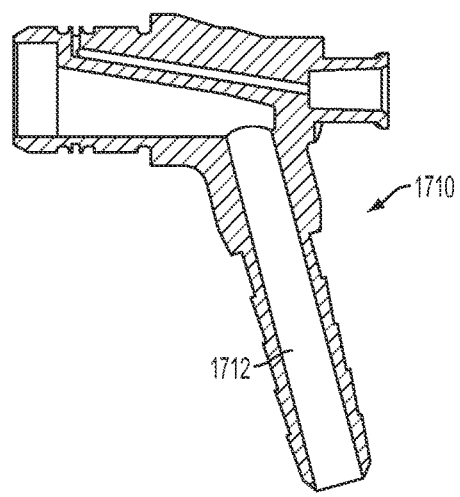
Figure 18A:
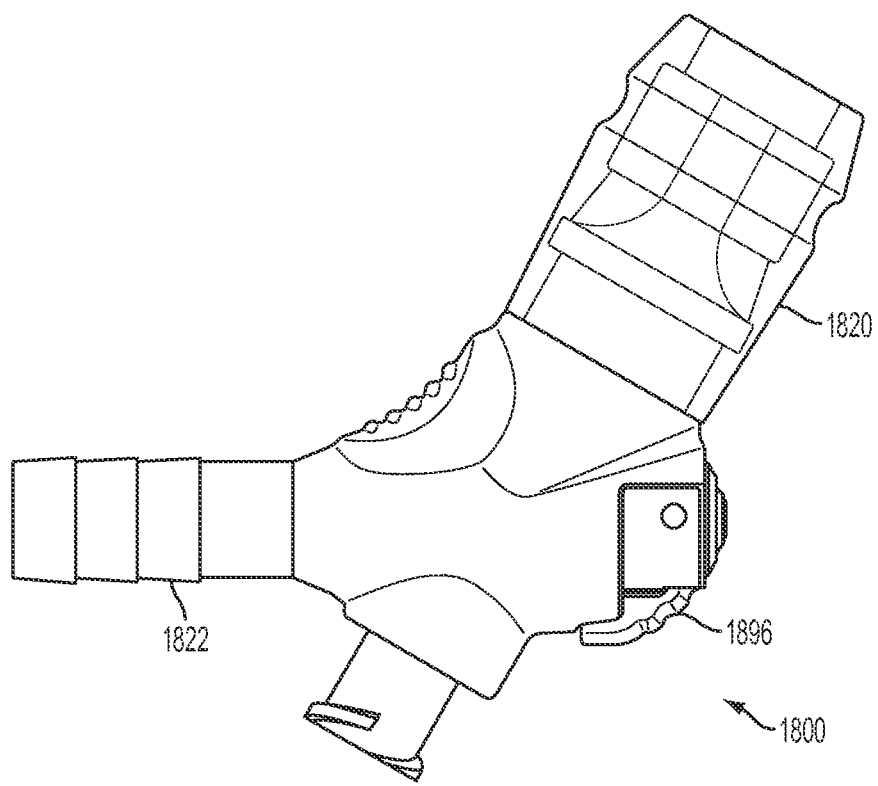
FIGS. 18A-E depict an alternative embodiment of a dispensing apparatus.
Figure 18B:
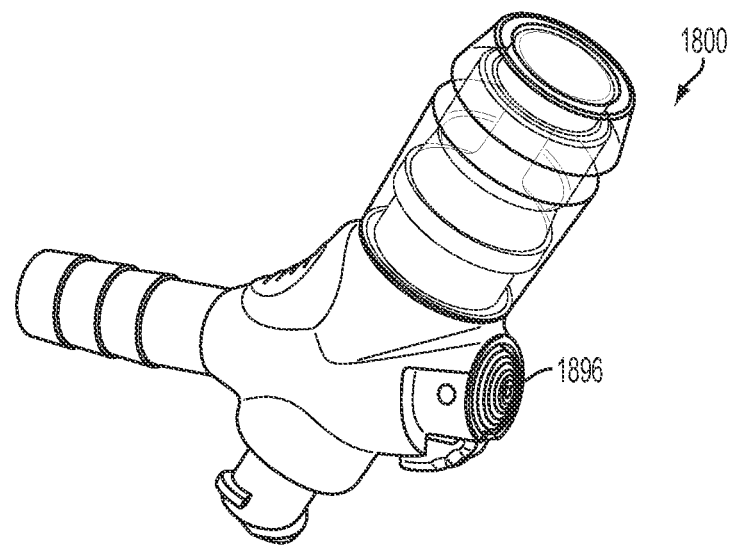
Figure 18C:
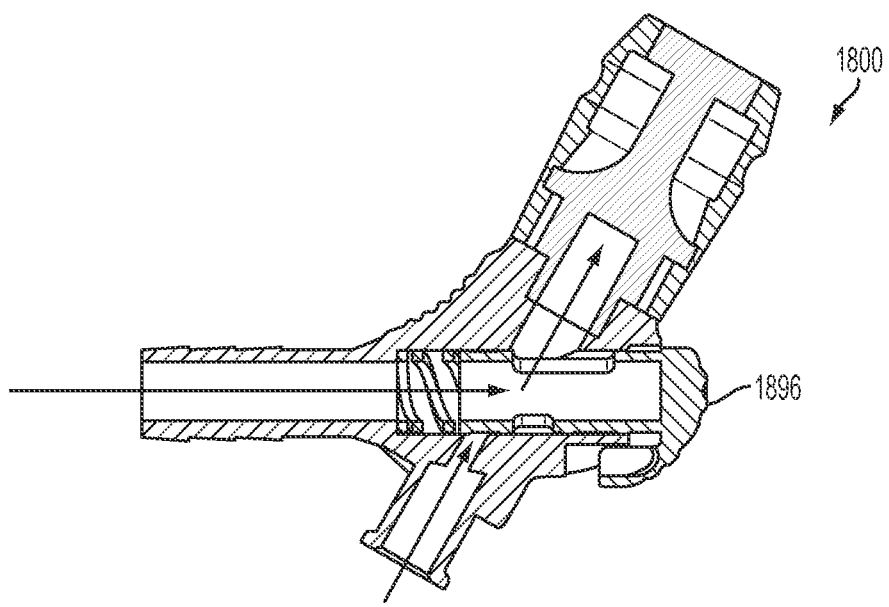
Figure 18D:
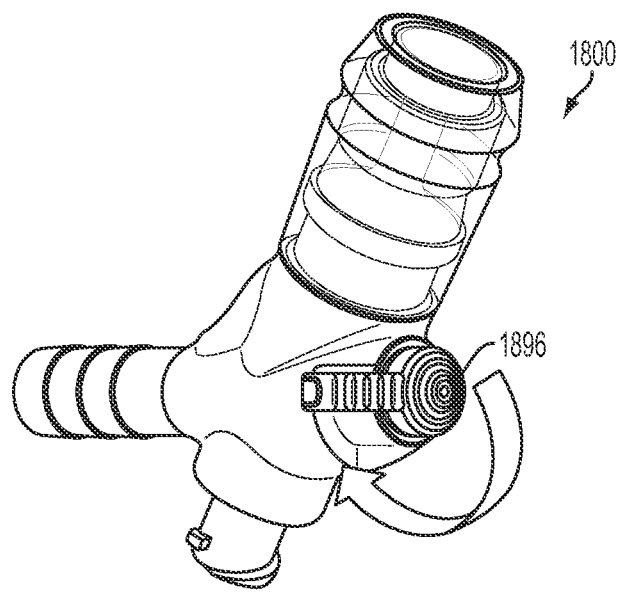
Figure 18E:
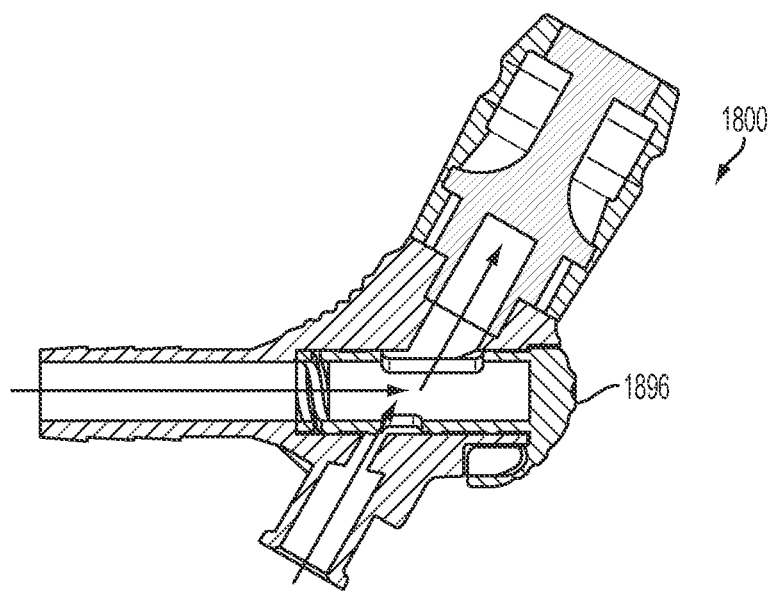

FIGS. 17A-C illustrate a housing 1710 including a primary material inlet 1712 whose outer diameter may be slightly larger than the inner diameter of the hose (not shown) that slides over it. A hose made of rubber or a similarly flexible material can be used. The portion of the hose that engages with the primary material inlet 1712 may stretch to accommodate the outer diameter of the primary material inlet 1712, ensuring a tight seal between the hose and the primary material inlet 1712. The primary material may enter the housing 1710 through the primary material inlet 1712 from the hose and exit the housing through a housing outlet 1714. The pliable bite valve (see, 1320 FIG. 13A) may attach to the housing 1710 around a ribbed exterior of the housing outlet. The housing 1710 may further include a conical fitting. The conical fitting, as described above, may be geometrically equivalent to fittings typically used with medical devices. The geometry of the conical fitting may be determined by the international standard for 6% (Luer) taper (ISO 594-1 and ISO 594-2). The conical fitting may be the point at which the secondary material is introduced into the dispensing apparatus.

As shown in FIG. 17B, the ribbed exterior around which the pliable bite valve (see, 1320 FIG. 13A) may fit includes multiple annular grooves 1716, 1716', 1716". The annular groove 1716' is where the secondary material may flow from the housing 1710 to the pliable bite valve. The annular grooves 1716, which are directly adjacent to and on either side of the annular groove 1716', allow the pliable bite valve to seal and isolate the annular groove. The annularity of the annular grooves, 1716, 1716', 1716" allows the pliable bite valve to be rotated about the main axis of the housing 1710 and still allow for the flow of the secondary material from the housing 1710 to the pliable bite valve. The annular grooves provide an axial locator for the pliable bite valve when the pliable bite valve is engaged with on the housing 1710.

FIG. 17C is a cross-sectional view of the housing 1710 taken along the lines 17C-17C in FIG. 17B. The housing 1710 includes a secondary material inlet 1718, which is the tapered interior portion of the conical fitting. A secondary material tube, not shown, may include a secondary material outlet (not shown) that fits within the secondary material inlet. The secondary material outlet of the secondary material tube may also include threads that align with the threads of the conical fitting. When tightened 90 degrees from initial thread start of the conical fitting and the secondary material tube, the threads and tapered portion on each component may align and create a seal. Additionally, the secondary material tube may include a mechanism to stop the tightening rotation such that the secondary material tube attaches parallel to the primary material inlet.

FIGS. 18A-E illustrate a dispensing apparatus 1800 which includes a pliable valve 1820. The dispensing apparatus has a first delivery member 1822. The pliable valve 1820 has a front face, and an aperture. Control of the valves may occur via manual activation of, for example, a button 1896. In one configuration, pressing the button 1896 can result in opening a valve to release materials from both the first reservoir and the second reservoir, while twisting the button can lock the mechanism in place such that the valves remain, for example, in a closed position.

II. Methods of Using the Fluid Delivery System

During use of the devices and systems described above, the user can selectively draw from two or more components (e.g., gas or liquid) by manipulating a valve to control a primary valve and a secondary valve. Control of the primary and secondary valves can be achieved in a hands free manner by, for example, adjusting the position of the user's lips or teeth on the bite valve or applying suction. The hands free control allows the user to achieve a desired amount of the primary material and the secondary material, respectively.

In at least some configurations, for example, when the user manipulates the pliable bite valve, the inner diameters of the primary valve passageway and the secondary valve passageway change, which compresses the primary valve components and the secondary valve components. This compression causes the primary valve slit and the secondary valve slit to open or close and broaden or narrow.

In at least some configurations, for example, when the user manipulates the pliable valve by applying suction, the inner diameters of the primary valve passageway and the secondary valve passageway change, which compresses the primary valve components and the secondary valve components. This compression causes the primary valve slit and the secondary valve slit to open or close and broaden or narrow.

III. Kits

Components of the devices disclosed above can be provided in a kit which can be made available in suitable packaging. Kits can comprise, for example, a dispensing apparatus, one or more pliable bite valves, one or more primary delivery members, one or more secondary delivery members, and one or more materials for delivery members, or combinations thereof. Additionally, kits can include reservoirs which are prefilled or fillable with electrolytes, carbohydrates, alcohol, and medicaments.

IV. Examples

A. Sports Hydration

A user deploys the device with a first reservoir containing water and a second reservoir containing an electrolyte and/or carbohydrate based solution. During exercise, the user applies hands-free pressure to the bite valve to deliver water, electrolyte/carbohydrate solution, or a combination thereof. This example also applies this technology to a water bottle where the bottle takes the place of the reservoir housing the primary fluid.

B. Patient Care

A patient deploys the device with a first reservoir containing fluid (e.g. gas or liquid) and a second reservoir containing a suitable medicament solution. The user applies hands-free control of the valve to deliver fluid, medicament solution, or a combination thereof. The medicament solution can be an electrolyte solution, a nourishment supplement, a juice concentrate, or a fluid with medication dispersed therein. Use of the device in the patient treatment context enables the patient to stay appropriately hydrated as well as have a self-regulated medicament solution, which can be challenging in the clinical setting. One example of this self-regulation of the medicament solution, applies to patients with type 2 diabetes in management of their blood glucose level. Another example applies to patients with chronic pain where the medicament solution can be self-regulated to reduce patient discomfort.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus comprising:
   a pliable valve comprising a primary passageway, a secondary passageway, a primary valve capable of obstructing the primary passageway, and a secondary valve capable of obstructing the secondary passageway, wherein hands-free force applied to an exterior surface of the pliable valve opens one or more of the primary valve and the secondary valve;
   a first surface feature on the exterior surface of the pliable valve, and a second surface feature on the exterior surface of the valve; and
   a control valve disposed within a valve cavity of the pliable valve, the control valve comprising a plug capable of closing a proximal aperture, a bite bulb, a main body, and a blocking component capable of closing a distal aperture.

2. The apparatus of claim 1 further comprising a housing comprising one or more of a primary material inlet, a secondary material inlet, a piercing valve, a primary material outlet, a secondary material outlet, and a dispersed material outlet.

3. The apparatus of claim 2 wherein the dispersed material outlet comprises a plurality of apertures oriented radially surrounding the secondary material outlet.

4. The apparatus of claim 2 further comprising a secondary material reservoir couplable to the housing, wherein the secondary material reservoir further comprises a seal capable of receiving the piercing valve.

5. The apparatus of claim 2 further comprising a hose couplable to a reservoir and the housing.

6. The apparatus of claim 5, further comprising a fluid connecting port capable of routing fluid from the hose through at least one of the primary material outlet and the dispersed material outlet.

7. The apparatus of claim 1, wherein the pliable valve is orally manipulatable to draw material through at least one of a first slit and a second slit.

8. The apparatus of claim 4, wherein the housing includes a structure capable of preventing an obstruction of a secondary material in the secondary material reservoir.

9. An apparatus comprising:
   a housing comprising one or more material inlets, and a housing outlet; and
   a pliable bite valve comprising a primary passageway, a secondary passageway, a primary valve capable of obstructing the primary passageway, and a secondary valve capable of obstructing the secondary passageway wherein a biting force applied to an exterior surface of the pliable bite valve opens one or more of the primary valve and the secondary valve;
   wherein the secondary valve comprises at least two vertical walls and, the two vertical walls form a slit, and the secondary passageway merges within the slit beneath a secondary bite position on the exterior surface of the pliable bite valve.

10. The apparatus of claim 9, wherein the biting force causes the secondary valve to collapse, the slit to open, and the secondary passageway to close.

11. The apparatus of claim 9, wherein the housing further comprises a first annular groove, a second annular groove, and a third annular groove.

12. The apparatus of claim 11, wherein the first annular groove and the third annular groove engage with the pliable valve, and the second annular groove is capable of receiving a secondary material from a secondary material tube and routing the secondary material to the pliable valve.

13. An apparatus comprising:
   a pliable valve comprising a primary passageway, a secondary passageway, a primary valve capable of obstructing the primary passageway, and a secondary valve capable of obstructing the secondary passageway, wherein hands-free force applied to an exterior surface of the pliable valve opens one or more of the primary valve and the secondary valve, wherein:
   the pliable valve further comprises a wall defining a valve cavity having a primary axis,
   the hands-free force is a biting force applied to the pliable wall in a transverse direction with respect to the primary axis of the valve cavity,
   the pliable valve further comprises a first surface feature and a second surface feature,
   application of the biting force to the first surface feature opens the primary valve, and
   application of the biting force to the second surface feature opens the primary valve and the secondary valve.

14. The apparatus of claim 13, further comprising a control valve configured and dimensioned to fit within the valve cavity.

15. The apparatus of claim 14, wherein application of the biting force moves the control valve within the valve cavity in a direction substantially parallel to the primary axis of the valve cavity.

16. The apparatus of claim 15, wherein application of the hands-free force at a first bite position on the pliable valve translates the control valve in a first direction, and application of the hands-free force at a second bite position on the pliable valve translates the control valve in a second direction opposite the first direction.

17. The apparatus of claim 16, wherein:
   the control valve comprises a bite bulb having a first angled face and a second angled face,
   application of the hands-free force at the first bite position causes the interior surface of the pliable valve wall to contact the first angled face and translate the control valve in the first direction, and
   application of the hands-free force at the second bite position causes the interior surface of the pliable valve wall to contact the second angled face and translate the control valve in the second direction.

18. The apparatus of claim 17, wherein said control valve further comprises:
   a plug configured and dimensioned to fit within an aperture on a front face of the bite valve;
   a main body; and
   a distal blocking component, wherein:
   the primary valve comprises a seal on the main body, and the secondary valve comprises the blocking member.

19. The apparatus of claim 18, wherein:
   with the control valve in a resting position the primary valve and secondary valve are closed, translation in the first direction from the resting position opens the primary valve to allow flow of a primary material through the pliable valve and closes the secondary valve to obstruct flow of a secondary material, and translation in the second direction from the resting position opens the primary valve and the secondary valve to allow flow of the primary material and the secondary material through the pliable valve.

20. An apparatus comprising:

a pliable bite valve having an inner wall surrounding a valve cavity; and a control valve disposed within the valve cavity, said control valve selectively movable within the valve cavity along a primary axis of the bite valve to control flow of one or more materials through the valve cavity, wherein:

said control valve is configured and dimensioned to move along the primary axis of the bite valve in response to a biting force applied to the bite valve, said pliable bite valve further comprises a first surface feature and a second surface feature, and said control valve is further configured and dimensioned to move in a first direction along the primary axis in response to application of the biting force at the first surface feature, and to move in a second direction opposite the first direction in response to application of the biting force applied at the second surface feature.

21. The apparatus of claim 20, further comprising a housing secured to the bite valve, said housing including one or more inlets, wherein the control valve is movable within the valve cavity to selectively open and close the one or more inlets.

22. The apparatus of claim 21, wherein the one or more inlets comprise a primary material inlet and a secondary material inlet.

23. The apparatus of claim 22, wherein:

in a resting position the control valve obstructs flow of the primary material from the primary material inlet and secondary material from the secondary material inlet, translation of the control valve in the first direction from the resting position allows flow of the primary material through the valve cavity and obstructs flow of the secondary material from the second inlet, and translation of the control valve in the second direction from the resting position allows flow of the primary material and the secondary material through the valve cavity.

24. The apparatus of claim 20, wherein:

said control valve comprises a bite bulb having a first angled face and a second angled face, application of the biting force at the first surface feature forces the inner wall towards the first angled face and moves the control valve in the first direction, and application of the biting force at the second surface feature forces the inner wall towards the second angled face and moves the control valve in the second direction.

25. The apparatus of claim 24, wherein said control valve further comprises:

a plug configured and dimensioned to fit within an aperture on a face of the bite valve;

a main body comprising a seal for selectively restricting flow of the one or more materials through the valve cavity;

a blocking component for blocking a secondary material inlet; and a pin for piercing the secondary material inlet.

26. The apparatus of claim 25, further comprising a housing cap configured and dimensioned to secure the control valve within the valve cavity and to engage the seal of the main body when the control valve is in a resting position.

27. The apparatus of claim 26, further comprising a spring disposed within the housing and configured to bias the control valve toward the resting position.

* * * * *